United States Patent
Komatsu et al.

(10) Patent No.: US 8,882,128 B2
(45) Date of Patent: Nov. 11, 2014

(54) REAR PORTION STRUCTURE FOR SADDLE TYPE VEHICLE

(71) Applicant: Honda Motor Co., Ltd., Tokyo (JP)

(72) Inventors: Yoji Komatsu, Wako (JP); Shinichi Karube, Wako (JP); Shin Yokoyama, Wako (JP); Kaori Inada, Wako (JP); Tomoki Fusano, Wako (JP); Takaaki Kasai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/096,632

(22) Filed: Dec. 4, 2013

(65) Prior Publication Data

US 2014/0167387 A1    Jun. 19, 2014

(30) Foreign Application Priority Data

Dec. 13, 2012    (JP) ................. 2012-272425

(51) Int. Cl.
| | | |
|---|---|---|
| B62J 7/02 | (2006.01) | |
| B62J 11/00 | (2006.01) | |
| B62K 11/00 | (2006.01) | |
| B62K 11/02 | (2006.01) | |

(52) U.S. Cl.
CPC ...................................... *B62K 11/02* (2013.01)
USPC ........ 280/288.4; 180/219; 224/413; 224/419; 224/437; 224/438

(58) Field of Classification Search
CPC ................. B62J 7/00; B62J 7/02; B62J 7/08; B62J 9/00; B62J 9/001; B62K 11/00; B62K 11/02; B62K 19/40; B62K 19/46
USPC .......... 180/219, 220, 227; 224/413, 418, 419, 224/421, 425, 426, 429, 430, 436, 437, 224/438; 280/202, 288.4, 304.5
See application file for complete search history.

(56) References Cited

U.S. PATENT DOCUMENTS

| | | | | | |
|---|---|---|---|---|---|
| 4,549,629 | A | * | 10/1985 | Komuro ........................ | 180/219 |
| 7,249,648 | B2 | * | 7/2007 | Michisaka et al. ............. | 180/219 |
| 7,311,232 | B2 | * | 12/2007 | Watanabe et al. ............. | 224/413 |
| 7,823,677 | B2 | * | 11/2010 | Minami et al. ................ | 180/219 |
| 7,997,602 | B2 | * | 8/2011 | Chan et al. .................... | 280/202 |
| 8,272,460 | B2 | * | 9/2012 | Song et al. .................... | 180/6.24 |
| 2008/0174099 | A1 | * | 7/2008 | Brown .......................... | 280/854 |
| 2010/0012695 | A1 | * | 1/2010 | DeMilio ........................ | 224/413 |
| 2010/0243691 | A1 | * | 9/2010 | Salisbury ...................... | 224/413 |
| 2011/0049205 | A1 | * | 3/2011 | Laperle et al. ................ | 224/425 |

FOREIGN PATENT DOCUMENTS

JP        2011-057071        3/2011

* cited by examiner

*Primary Examiner* — Joseph M Rocca
*Assistant Examiner* — Marc A Scharich
(74) *Attorney, Agent, or Firm* — Rankin, Hill & Clark LLP

(57) ABSTRACT

Stay members to which various parts are to be attached are provided at a rear portion of a motorcycle, and stay supporting portions that support the stay members are provided on a vehicle body frame. The various parts include side bag supporting members and a carrier member. The side bag supporting members and the carrier member are fastened together to the stay members by a plurality of fastening members, and the stay members to which the side bag supporting members and the carrier member are fastened together are fastened to the stay supporting portions.

20 Claims, 18 Drawing Sheets

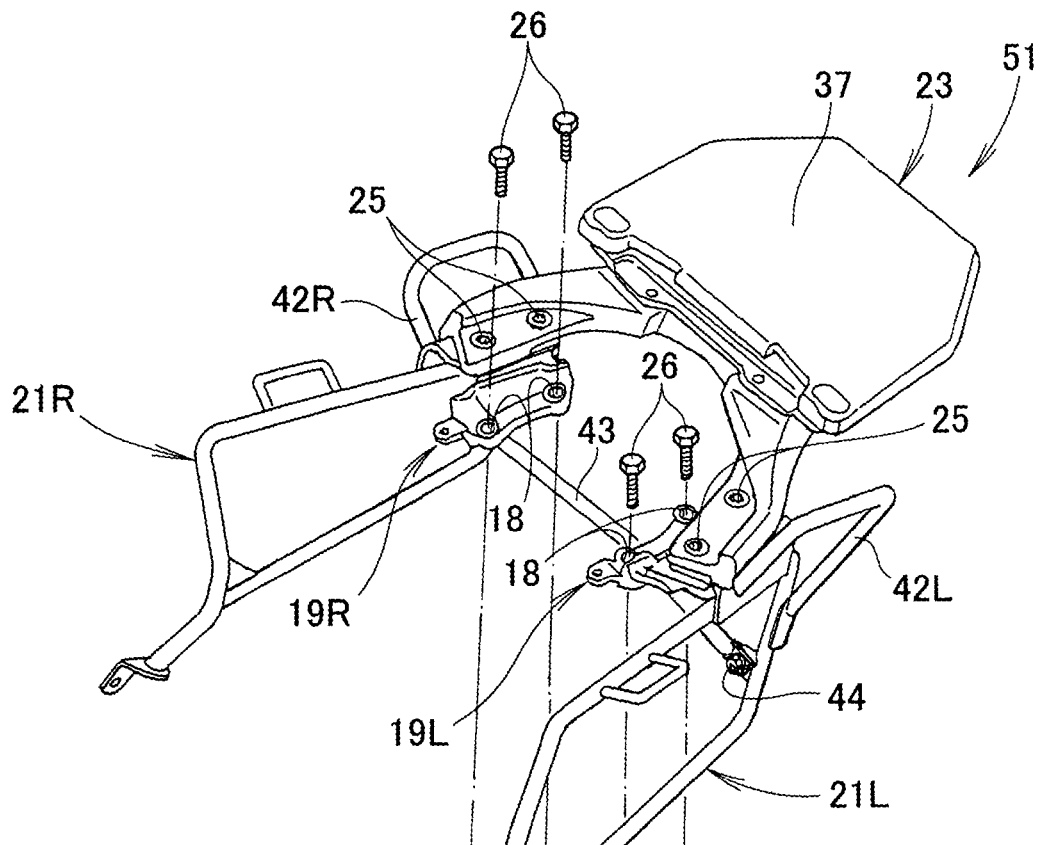
FIG. 3
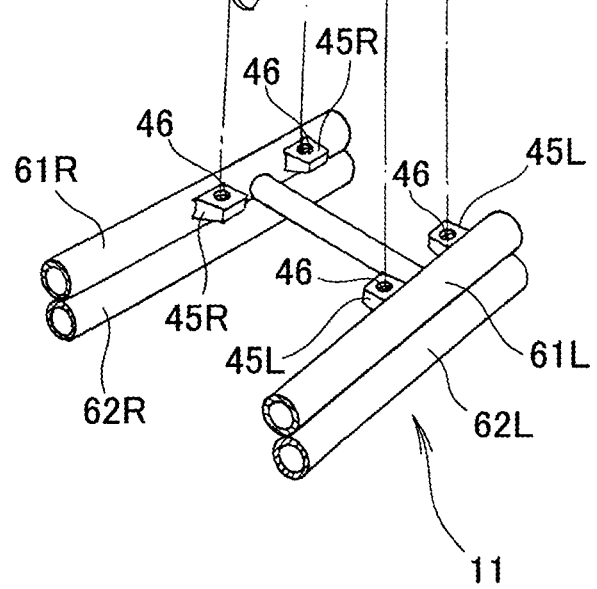

REAR PORTION STRUCTURE FOR SADDLE TYPE VEHICLE

BACKGROUND OF THE INVENTION

1. Field of the Invention

The present invention relates to improvements in or relating to a rear portion structure for a saddle type vehicle.

2. Description of Related Art

A saddle type vehicle is known wherein a side bag supporting stay for supporting a side bag in which an article is accommodated is provided at a rear portion of the vehicle. For example, as shown in FIGS. 2, 3 and 5 of Japanese Patent Laid-Open No. 2011-57071, side bag supporting stays (55L and 55R) (each numeral in parentheses represents a reference symbol used in the referenced Japanese Patent Laid-Open No. 2011-57071; this similarly applies also to the following description) are individually attached to grab rail stays (125L and 125R) and pillion step stays (97L and 97R) provided on a vehicle body (50) side. If the shape of the side bag supporting stays is changed, then it is necessary to change the positions of the vehicle body side attaching portions every time. If the positions of the vehicle body side attaching portions are changed, then it is necessary to prepare a plurality of vehicle body frames wherein the positions of the vehicle body side attaching portions are changed. Further, in order to pass a plurality of vehicle body frames while predetermined assembly productivity is maintained, significant remodeling of the main assembly line sometimes becomes required.

A technology which can suppress am increase in the types of vehicle body frames even when various attaching parts, such as side bag supporting stays, are different among different vehicle models and variations of vehicle models increase is desired.

SUMMARY OF THE INVENTION

It is an object of the present invention to provide a technique that can suppress increasing the number of types of a vehicle body frames even when a plural number of types are required for various attachment parts.

In accordance with one aspect of the invention, there is provided a rear portion structure for a saddle type vehicle that includes a vehicle body frame, a seat attached to the vehicle body frame and capable of supporting a rider and a passenger, and a stay supporting portion provided on the vehicle body frame below the seat and supporting the stay member thereon. Various parts are attached to the stay member. The various parts include a side bag supporting member with which a grip portion, which is gripped or held by the passenger, is integrated and which supports a side bag, and a carrier member for supporting luggage. A first fastening hole is provided on the stay member. A second fastening hole is provided on the side bag supporting member. A carrier member fastening hole is provided on the carrier member. The stay member extends outwardly in a vehicle widthwise direction farther than the seat. The second fastening hole or the second fastening hole and the carrier member fastening hole are aligned with the first fastening hole. The side bag supporting member with which the grip portion is integrated or the side bag supporting member with which the grip portion is integrated and the carrier member are fastened to the stay member by one or more fastening members. The rear portion of the motorcycle has the stay supporting portion provided on the vehicle body frame and supporting the stay member thereon, and the various parts are selectively attached to the stay member.

As an assembling procedure to the vehicle body frame, the side bag supporting member is fastened to the stay member, or the side bag supporting member and the carrier member are fastened to the stay member. Then, the stay member to which the side back supporting member is fastened or the stay member to which the side bag supporting member and the carrier member are fastened is attached to the stay supporting portion of the vehicle body frame. A selected one or two parts can be fastened to the stay member, and the common stay member to which the various parts are fastened is attached to the stay supporting portion of the vehicle body frame. Since attaching portions of the various parts are fastened by the common stay member and attached to the vehicle body frame, increase of the number of types of the vehicle body frame can be suppressed and the vehicle cost can be reduced.

In accordance with another aspect of the invention, the rear portion of the motorcycle includes the stay supporting portion provided on the vehicle body frame and supporting the stay member thereon, and the various parts are selectively attached to the stay member. The rear portion structure for a saddle type vehicle which includes a vehicle body frame, a seat attached to the vehicle body frame and capable of supporting a rider and a passenger, and a stay supporting portion provided on the vehicle body frame below the seat and supporting the stay member thereon. Various parts are attached to the stay member. The various parts include at least two parts selected from a group including a side bag supporting member for supporting a side bag, a grip, which is held or gripped by the passenger, and a carrier member for supporting luggage. A first fastening hole is provided on the stay member. A second fastening hole is provided on the side bag supporting member. A third fastening hole is provided on the grip. A carrier member fastening hole is provided on the carrier member. The stay member extends outwardly in a vehicle widthwise direction farther than the seat. At least two holes selected from a group including the second fastening hole, third fastening hole and carrier member fastening hole are aligned with the first fastening hole, and two or all three of the following group: the side bag supporting member, the grip, and the carrier member, are fastened together to the stay member.

As an assembly procedure to the vehicle body frame, at least two of the side bag supporting member, grip, and carrier member are fastened together to the stay member, and the stay member to which at least two or all three of the parts described above are fastened together by the fastening member is fastened to the stay supporting portion of the vehicle body frame. Since the various parts are attached to the stay supporting portion of the vehicle body frame through the common stay member, increase of the number of types of the vehicle body frame can be suppressed. As a result, increase of the number of types of the vehicle body frame can be suppressed and the vehicle cost can be reduced. Further, also where variations of the vehicle model increase, a significant change of a production line is not required. Further, in comparison with an alternative case in which at least two of the parts are fastened individually to vehicle body frames or at least two of the parts are individually fastened to stay members, if two or all three of the parts are fastened together to the stay member as in the present invention, the installation man-hours can be suppressed and reduction of the quantity of fastening parts can be anticipated.

In accordance with another aspect of the invention, the stay member is a forged steel part extending horizontally and includes an outer side portion positioned outwardly in the vehicle widthwise direction farther than the seat, and is disposed between the seat and a rear cowl that covers a side of a rear portion of the vehicle body frame; and when the seat is removed, the stay supporting portion is open upwardly. By disposing the stay member, which extends horizontally, between the seat and the rear cowl, the seat can be disposed in proximity of the rear cowl and the height of the seat can be reduced or suppressed low. In addition, by disposing the seat in the proximity of the rear cowl, the gap between the seat and the rear cowl decreases, and water becomes less likely to enter the inner side of the vehicle body. As a result, the height of the seat is maintained or suppressed low, and water becomes less likely to enter the inner side of the vehicle body. Further, since the stay supporting portion is open upwardly, a fastening tool can be moved toward the stay supporting portion from above. Accordingly, with the stay supporting portion open upwardly, the stay member to which the various parts are fastened or fastened together can be attached readily to the stay supporting portion.

In accordance with another aspect of the invention, two front and rear hole portions to be fastened to the stay supporting portion are provided on the stay member. A first rib extends along a forward-rearward direction of the vehicle body frame below the seat and projects upwardly with respect to a lower end of a side portion of the seat in the vehicle widthwise direction. A second rib that extends so as to connect the two front and rear hole portions to each other on the inner side in the vehicle widthwise direction with respect to the first rib is formed at an inner side portion of the stay member. Since the second rib extends so as to connect the two hole portions to each other, even if water passes over the first rib, water can be prevented from entering into the inner side of the vehicle body by the second rib.

In accordance with another aspect of the invention, the stay member is disposed so as to be negatively inclined when extending toward a front of the vehicle body frame, and a drain hole disposed on the inner side of the stay member in the vehicle widthwise direction with respect to the first rib for discharging water therethrough is perforated at a front portion of the stay member. Since the stay member is negatively inclined when extending toward the front of the vehicle body frame and the drain hole is provided at a front portion of the stay member, even if water entering from the outside of the vehicle body passes over the first rib, the water flows downwardly along the slope and is discharged from the drain hole. As a result, the water passing over the first rib can be discharged readily.

In accordance with another aspect of the invention, the side bag supporting member includes a upper and lower pipe-shaped stays extending in a forward and rearward direction of the vehicle. The side bag includes an upper stay supporting portion and a lower stay supporting portion locked from above to the upper and lower pipe-shaped stays with elastic members interposed therebetween. Since the side bag has the upper stay supporting portion and the lower stay supporting portion, if a vehicle has a pipe-shaped stay at one of upper and lower portions, then the side bag can be incorporated into the vehicle. In addition, in a vehicle of a type lacking a pipe-shaped state but having, for example, a side bag attaching hole in the rear cowl, a side bag can be incorporated by hanging the stay supporting portion of the side bag in the side bag mounting hole.

In accordance with another aspect of the invention, the side bag includes a container portion and a lid portion that covers the container portion. A plurality of vertical ribs, which allow the lid portions to be guided and fitted, smoothly extend to the container portion in a direction in which the lid portion is fitted. A horizontal rib, which prevents water from entering, extends in a direction perpendicular to the direction in which the vertical ribs extend. Since the vertical ribs are provided, when the lid portion is closed to the container portion, the lid portion can be fitted smoothly into the container portion. Further, since the horizontal rib is provided, water becomes less likely to enter the container passing over the horizontal rib.

BRIEF DESCRIPTION OF THE DRAWINGS

FIG. 3 is an exploded perspective view illustrating that the first subassembly assembled in FIG. 2B is attached to a stay supporting portion.

DETAILED DESCRIPTION OF THE PREFERRED EMBODIMENT

In the following, an embodiment of the present invention is described in detail. In the figures and the embodiment, "upward," "downward," "forward," "rearward," "leftward" and "rightward" indicate directions as viewed from a rider who rides on a motorcycle.

A working example of the present invention is described with reference to the drawings. In the following, a structure wherein some parts are selected from among a plurality of types of parts (hereinafter referred to as various parts) at a rear portion of a saddle type vehicle (motorcycle 10) and are attached to a vehicle body frame 11 is described.

The various parts include side bag supporting members 21L and 21R, grips 22L and 22R, and a carrier member 23. Here, the side bag supporting members 21L and 21R (only reference symbol 21L on this side is shown) are members for supporting side bags (reference symbols 24L and 24R in FIG. 16) hereinafter described, and the grips (reference symbols 22L and 22R in FIG. 5) are members that can be gripped or held by a passenger on the motorcycle. The carrier member 23 is a member for supporting luggage.

Figure 1:
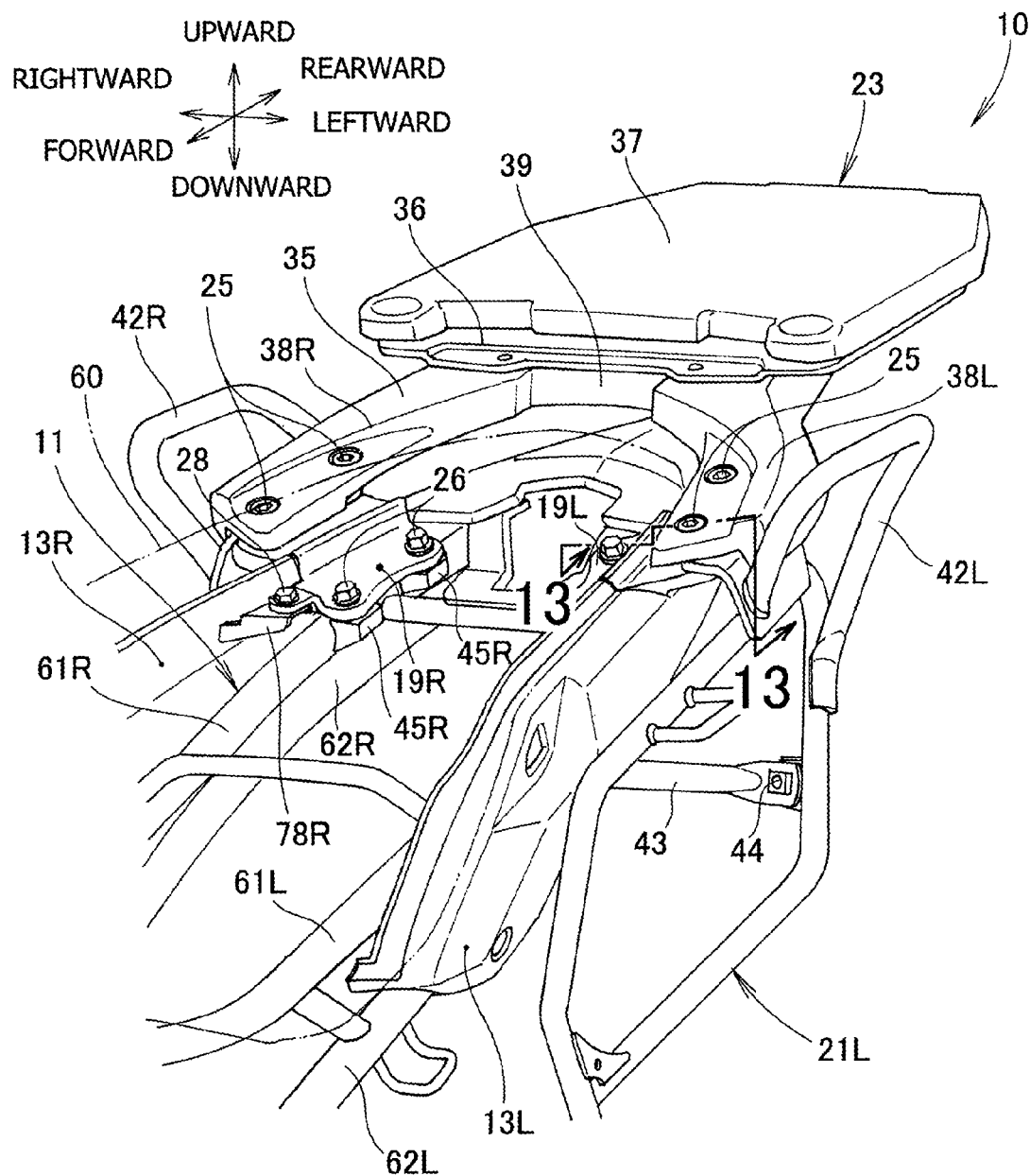
FIG. 1 is a perspective view of a rear portion of a motorcycle in which a side bag supporting member with which a grip portion is integrated and a carrier member are provided (in a state in which a seat is removed).

Here, to and with the side bag supporting members 21L and 21R of the type shown in FIG. 1, grip members 42L and 42R that are gripped or held by a passenger on the motorcycle are soldered and integrated. Meanwhile, a grip member is not included in side bag supporting members 121L and 121R of the type shown in FIG. 10, but rather is formed as a separate part.

In the following, four representative kinds of assemblies (variations) called first to fourth variations are picked up in the rear portion structure of a saddle type vehicle according to the present invention and are described. With reference to FIGS. 1 to 3, the first variation is described wherein side bag supporting members integrated with grip members to be gripped by the passenger on a motorcycle and a carrier member are subassembled (hereinafter also referred to as subassembly) to stay members and the subassembled side bag supporting members 21L and 21R and carrier member 23 are attached to a vehicle body frame 11. Then, with reference to FIGS. 4 to 6, the second variation is described wherein grips to be gripped by a passenger on a motorcycle and a carrier member are subassembled to stay members and the subassembled grips and carrier members are attached to a vehicle body frame. Then, with reference to FIGS. 7 to 9, the third variations is described wherein side bag supporting members integrated with grip members for being gripped by a passenger on a motorcycle are subassembled to stay members and the subassembled side bag supporting members are attached to a vehicle body frame. Then, with reference to FIGS. 10 to 12, the fourth variation is described wherein side bag supporting members which do not include a grip member, grips of independent parts and a carrier member are subassembled to stay members and the subassembled side bag supporting members, grips, and carrier member are attached to a vehicle body frame.

First, the first variation is described. As shown in FIG. 1, a vehicle body frame 11 is provided at a rear portion of a motorcycle 10, and stay members 19L and 19R are attached to the vehicle body frame 11. Side bag supporting members 21L and 21R (only reference symbol 21L on this side is shown) and a carrier member 23 are attached to the stay members 19L and 19R. On the inner side of the side bag supporting members 21L and 21R on the outer side of the vehicle body frame 11, rear cowls 13L and 13R, which cover the vehicle body frame 11, are disposed. The side bag supporting members 21L and 21R support side bags 24L and 24R (refer to FIG. 16), and grip members 42L and 42R, which are gripped or held by a passenger on the motorcycle, are integrated with the side bag supporting members 21L and 21R.

The side bag supporting members 21L and 21R are pipe-like members that exhibit a substantially rectangular shape as viewed in side elevation of the vehicle and on which the grip members 42L and 42R to be gripped by the passenger on the motorcycle are provided integrally on the rear portion side of the vehicle. Meanwhile, the carrier member 23 includes a U-shaped member 35 connected to the stay members 19L and 19R, a carrier stay 36 attached to a rear end of the U-shaped member 35, and a carrier main body 37 attached to the carrier stay 36 for receiving an article placed thereon.

The U-shaped member 35 includes left and right arm portions 38L and 38R and a bridging portion 39 extending between the left and right arm portions 38L and 38R and exhibits a substantially U shape. The U-shaped member 35 is disposed in such a direction that the vehicle front side thereof is open and the bridging portion 39 is positioned at the rearmost portion. The left and right arm portions 38L and 38R are attached to the stay members 19L and 19R by fastening members 25, respectively. The carrier stay 36 is attached to the bridging portion 39 positioned at the rearmost portion.

Figure 2A:
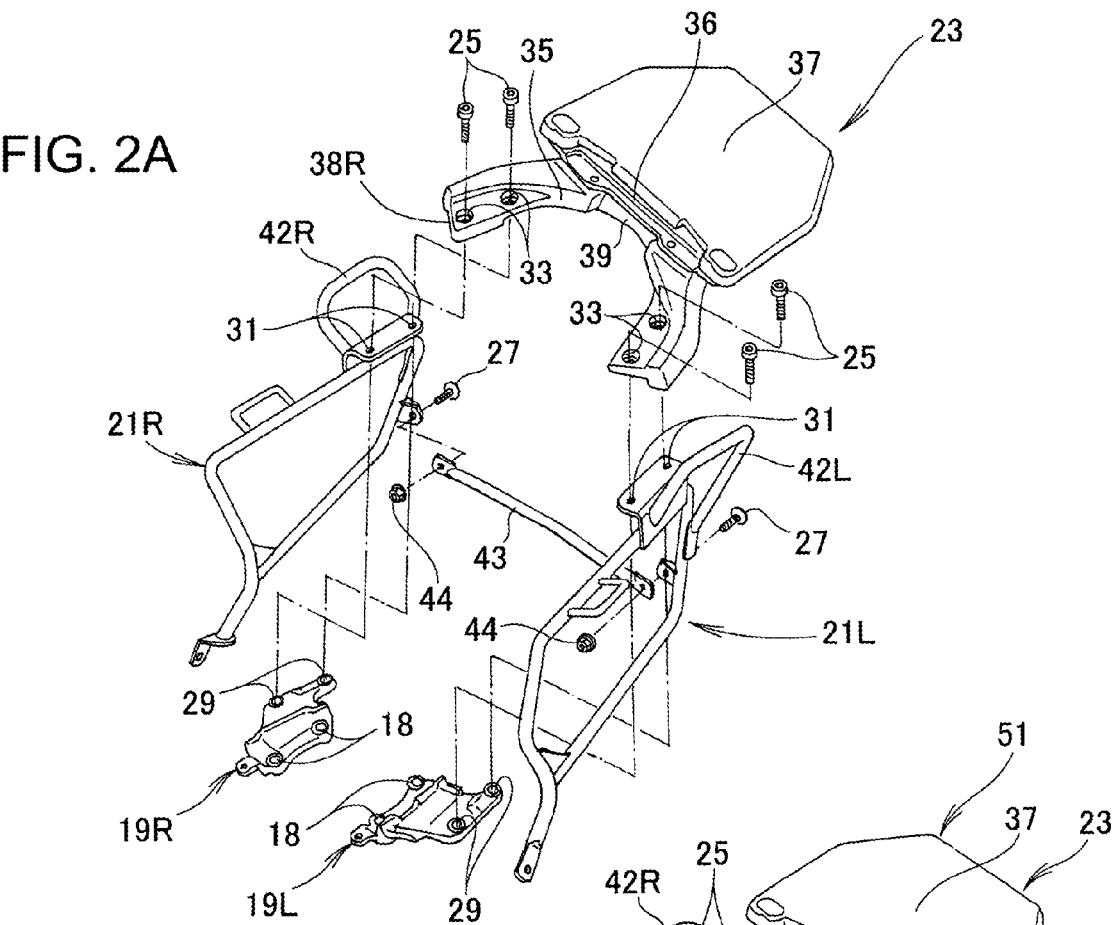
FIG. 2A is an exploded perspective view and FIG. 2B a perspective view illustrating that various parts are attached to a stay member to assemble a first subassembly.
Figure 2B:
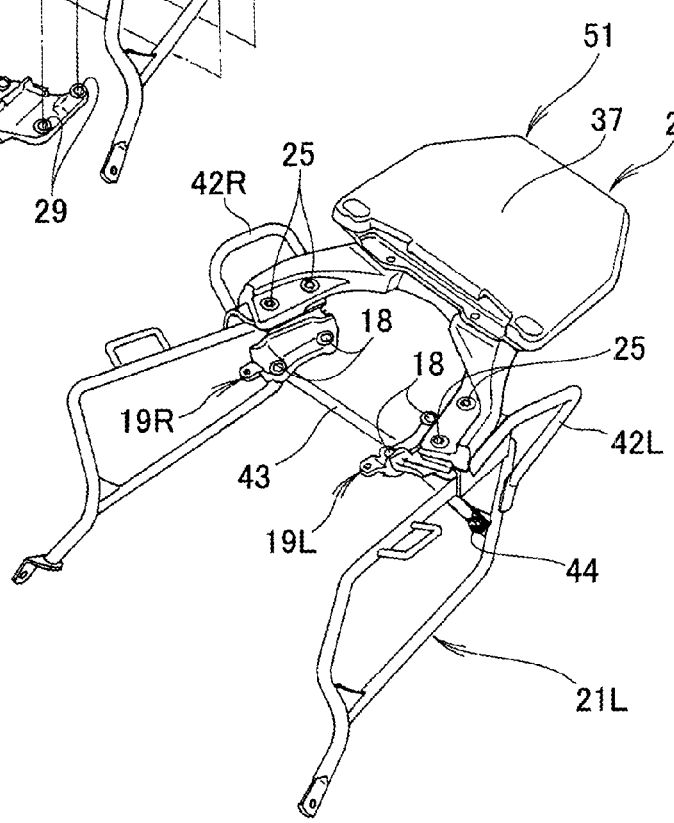

FIG. 2A is an exploded perspective view illustrating that the side bag supporting members 21L and 21R and the carrier member 23 are to be attached to the stay members 19L and 19R. FIG. 2B is a perspective view showing a first subassembly 51 wherein the side bag supporting members 21L and 21R and the carrier member 23 are attached to the stay members 19L and 19R.

Referring to FIG. 2A, two front and rear first fastening holes 29 in which female threaded portions are formed are provided on each of the stay members 19L and 19R, and two second fastening holes 31 are provided on each of the side bag supporting members 21L and 21R so as to correspond to the positions of the first fastening holes 29. Further, two carrier member fastening holes 33 are provided on each of the arm portions 38L and 38R of the carrier member 23. Thus, the side bag supporting members 21L and 21R and the carrier member 23 are placed in order on the stay members 19L and 19R, and the second fastening holes 31 and the carrier member fastening holes 33 are aligned with the first fastening holes 29. Then, the side bag supporting members 21L and 21R and the carrier member 23 are fastened to the stay members 19L and 19R together with the carrier member 23 from above by a plurality of fastening members 25.

Further, a cross stay 43, which connects the side bag supporting members 21L and 21R to each other, is connected to extend between the side bag supporting members 21L and 21R. The cross stay 43 is fastened at the opposite end portions thereof to portions in the proximity of the rear end of the side bag supporting members 21L and 21R by fastening members 27 and nuts 44.

FIG. 2B illustrates that the side bag supporting members 21L and 21R and the carrier member 23, which are in a state superposed one on the other, are fastened together to the stay members 19L and 19R by a plurality of fastening members 25. In the following description the side bag supporting members 21L and 21R and the carrier member 23, which are fastened together to the stay members 19L and 19R by the fastening members 25, are referred to as first subassembly 51.

It is to be noted that, while the side bag supporting members 21L and 21R and the carrier member 23 are fastened together to a plurality of first fastening holes 29 provided on the stay members 19L and 19R using the fastening members 25, fastening holes may be perforated separately on the stay members 19L and 19R such that the members mentioned are individually fastened to the separate fastening holes without fastening the side bag supporting members 21L and 21R and the carrier member 23 together.

Now, an example wherein the first subassembly 51 wherein the side bag supporting members 21L and 21R and the carrier member 23 are fastened together is attached to stay supporting portions 45L and 45R of the vehicle body frame 11 is described.

As shown in FIG. 3, two front and rear hole portions 18 to be individually attached to the vehicle body frame 11 (refer to FIG. 1) are provided on each of the stay members 19L and 19R at an inner position in the vehicle widthwise direction of the first fastening holes 29 (refer to FIG. 2). A plurality of stay fastening holes 46 are provided on the stay supporting portions 45L and 45R in a corresponding relationship to the hole portions 18. Female threaded portions are formed on the stay fastening holes 46, and the stay members 19L and 19R to which the side bag supporting members 21L and 21R and the carrier member 23 are fastened together are fastened to the stay supporting portions 45L and 45R by a plurality of fastening members 26 with the hole portions 18 aligned with the stay fastening holes 46. It is to be noted that, while the side bag supporting members 21L and 21R have the grip members 42L and 42R integrated therewith, side bag supporting members having a mode in which the grip members 42L and 42R are not included may be used instead.

Figure 4:
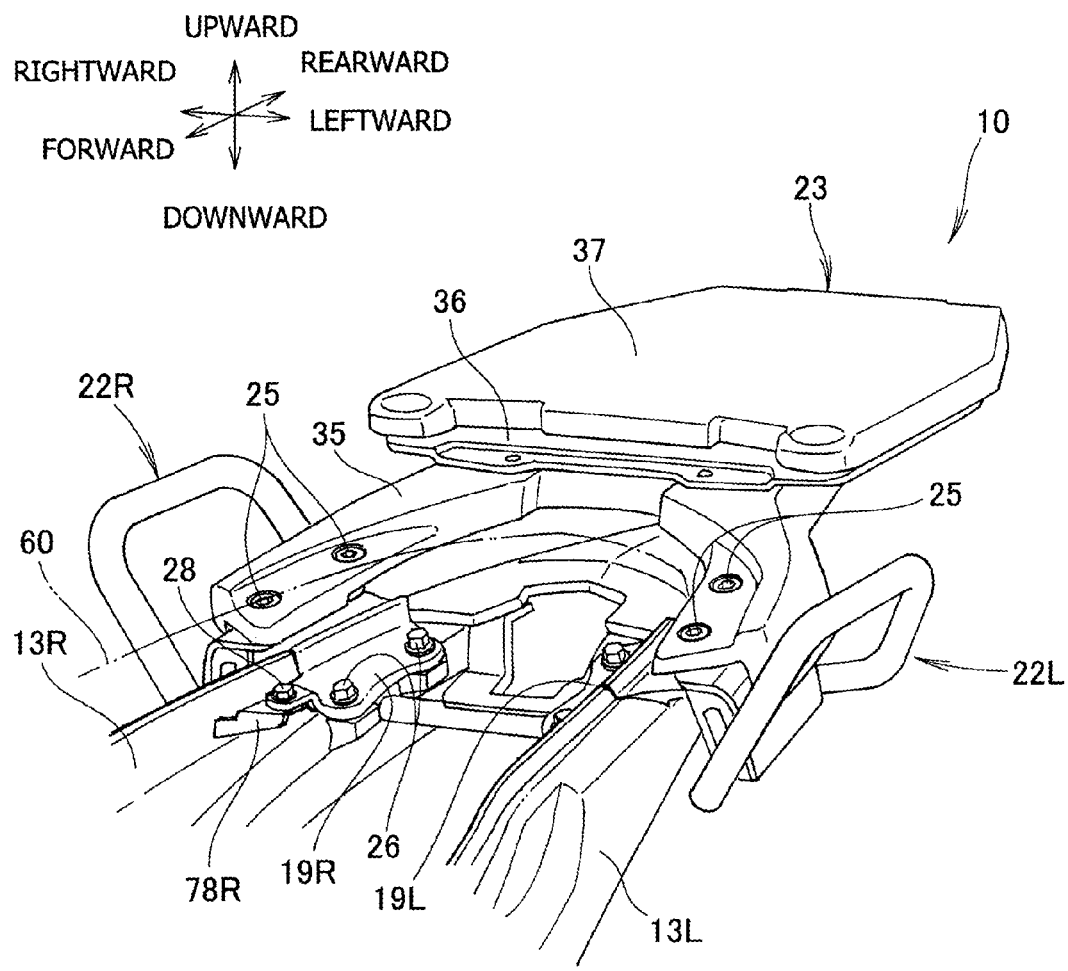
FIG. 4 is a perspective view of a rear portion of a motorcycle in which a grip and a carrier member are provided (in a state in which a seat is removed).

Now, the second variation is described. As shown in FIG. 4, a vehicle body frame 11 is provided at a rear portion of a motorcycle 10, and stay members 19L and 19R are attached to the vehicle body frame 11. The stay members 19L and 19R have grips 22L and 22R and a carrier member 23 attached thereto. Rear cowls 13L and 13R, which cover the vehicle body frame 11, are disposed on the inner side of the grips 22L and 22R on the outer side of the vehicle body frame 11.

Figure 5A:
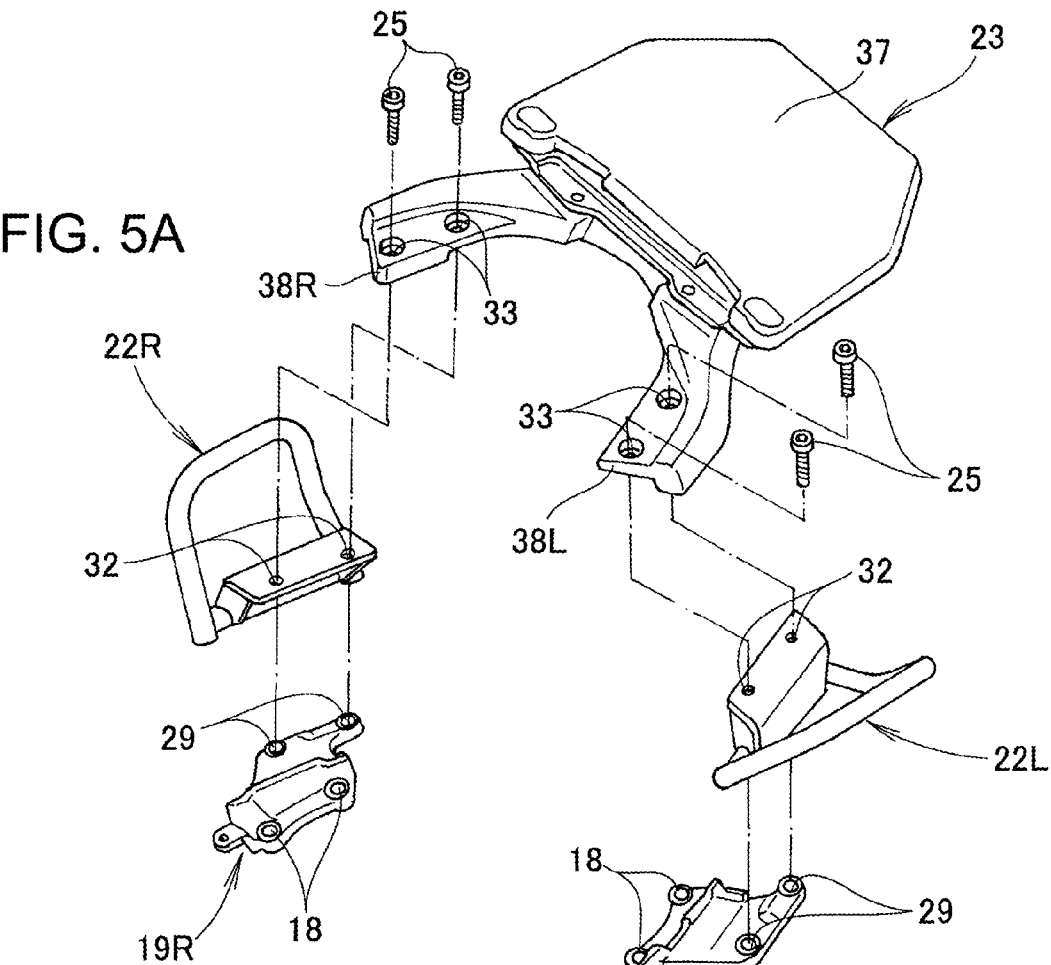
FIG. 5A is an exploded perspective view and FIG. 5B a perspective view illustrating that various parts are attached to a stay member to assemble a second subassembly.
Figure 5B:
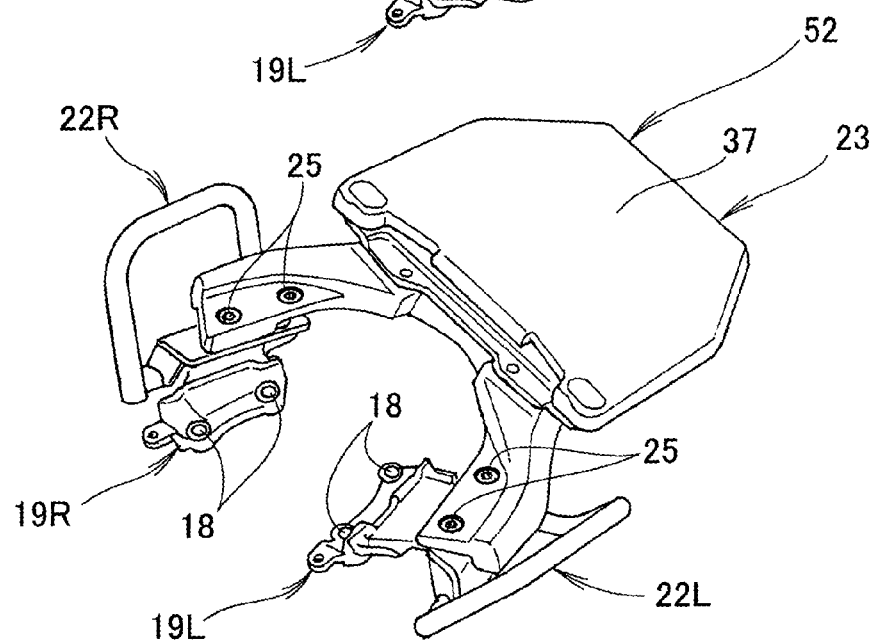

FIG. 5A is an exploded perspective view illustrating that the grips 22L and 22R and the carrier member 23 are attached to the stay members 19L and 19R, and FIG. 5B is a perspective view showing a second assembly 52 wherein the grips 22L and 22R and the carrier member 23 are attached to the stay members 19L and 19R.

Referring to FIG. 5A, two front and rear first fastening holes 29 on which female threaded portions are formed are provided on the stay members 19L and 19R, and third fastening holes 32 are provided on the grips 22L and 22R and carrier member fastening holes 33 are provided on the carrier member 23 in an aligned relationship with the positions of the first fastening holes 29. Further, the grips 22L and 22R and the carrier member 23 are placed one on the other in this order on the stay members 19L and 19R, and the third fastening holes 32 and the carrier member fastening holes 33 are aligned with the first fastening holes 29 to fasten the grips 22L and 22R and the carrier member 23 together to the stay members 19L and 19R from above by a plurality of fastening members 25.

FIG. 5B illustrates that the grips 22L and 22R and the carrier member 23, which are in a state superposed with each other, are fastened to the stay members 19L and 19R by a plurality of fastening members 25. In the following, the grips 22L and 22R and the carrier member 23 fastened together to the stay members 19L and 19R by the fastening members 25 are referred to as second assembly 52.

It is to be noted that, while the grips 22L and 22R and the carrier member 23 are fastened together to a plurality of first fastening holes 29 provided in the stay members 19L and 19R using the fastening members 25, as an alternative, separate fastening holes may be performed in the stay members 19L and 19R such that the members mentioned are fastened to the separate fastening holes without depending upon the fastening together of the grips 22L and 22R and the carrier member 23.

Now, an example in which the second assembly 52 wherein the grips 22L and 22R and the carrier member 23 are fastened together is attached to the stay supporting portions 45L and 45R of the vehicle body frame 11 is described.

Figure 6:
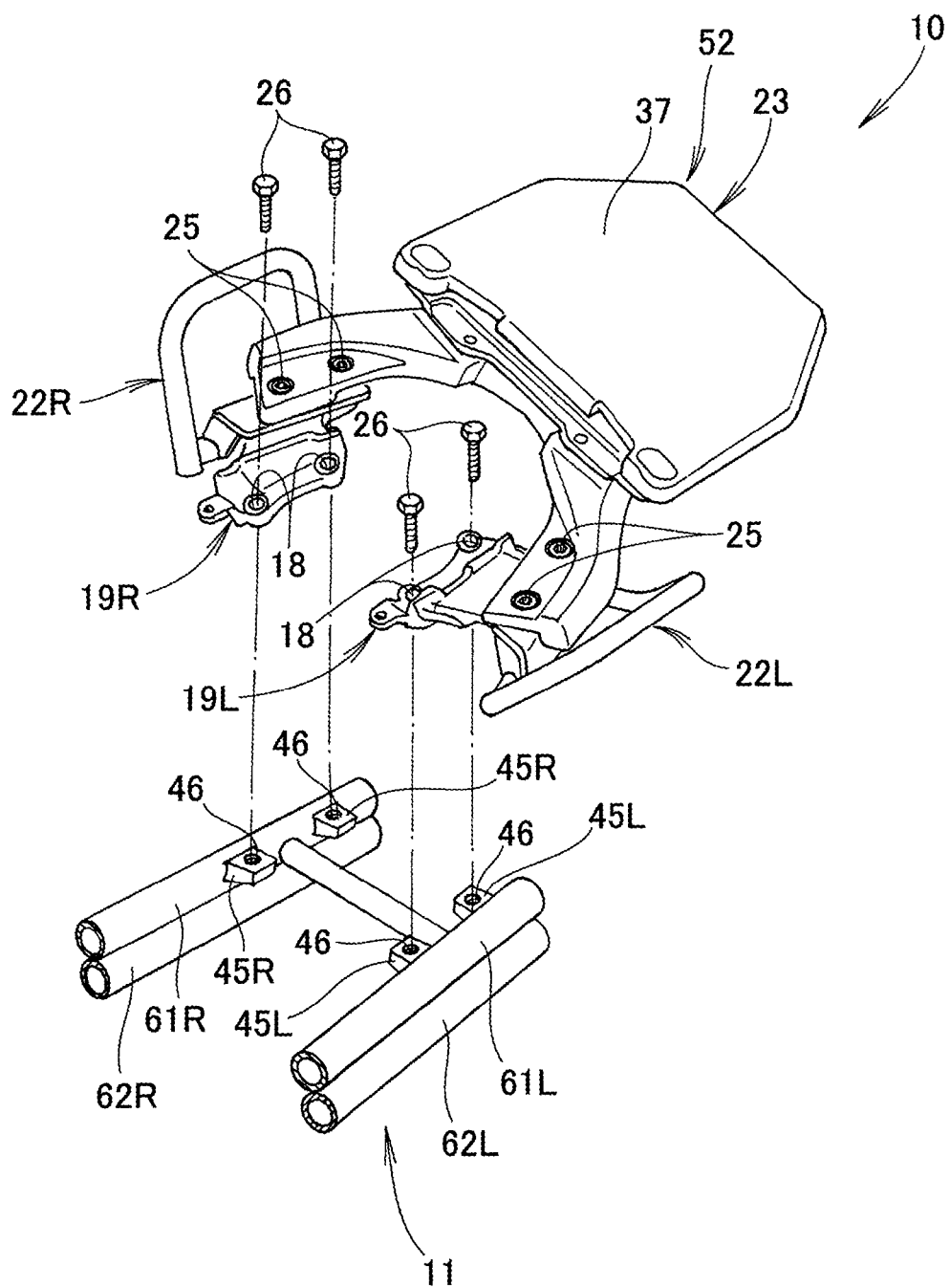
FIG. 6 is an exploded perspective view illustrating that the second subassembly assembled in FIG. 5B is attached to a stay supporting portion.

As shown in FIG. 6, hole portions 18 to be attached to the vehicle body frame 11 are provided in the stay members 19L and 19R at inner positions in the vehicle widthwise direction with respect to the first fastening holes (reference numeral 29 in FIG. 5). Two stay fastening holes 46 are provided on each of the stay supporting portions 45L and 45R in an aligned relationship with the hole portions 18. Female threaded portions are provided on the stay fastening holes 46, and with the hole portions 18 aligned with the stay fastening holes 46, the stay members 19L and 19R to which the grips 22L and 22R and the carrier member 23 are fastened together are fastened to the stay supporting members 45L and 45R by a plurality of fastening members 26.

Working of the rear portion structures for a saddle type vehicle described above is described. Referring also to FIG. 3, as a procedure for assembling various parts to the vehicle body frame 11, the side bag supporting members 21L and 21R and the carrier member 23 are fastened together to the stay members 19L and 19R in advance, or the grips 22L and 22R and the carrier member 23 are fastened together to the stay members 19L and 19R. Then, the stay members 19L and 19R to which the side bag supporting members 21L and 21R and the carrier member 23 are fastened together, or the stay members 19L and 19R to which the grips 22L and 22R and the carrier member 23 are fastened together, are attached to the stay supporting portions 45L and 45R of the vehicle body frame 11. In other words, the first subassembly 51 or the second assembly 52 is attached to the vehicle body frame 11.

Usually, on a main assembly line, after the stay members 19L and 19R are attached to the stay supporting portions 45L and 45R of the vehicle body frame 11, at least one part of the side bag supporting members 21L and 21R, carrier member 23, and grips 22L and 22R is attached to the stay members 19L and 19R. Where the type and the number of parts to be attached to a rear portion of a vehicle body is different depending upon the vehicle model, the number of assembly steps on the main assembly line is sometimes different, depending upon the vehicle model, and the workload is sometimes different, depending upon the step. Therefore, when a variation of the vehicle model is to be increased, the main assembly line is sometimes modified significantly. Such modification of the main assembly line leads to increase of the facility cost.

In this regard, in the present invention, after various parts are assembled to the stay members 19L and 19R to form a subassembly on a sub line in advance, the stay members 19L and 19R with which the various parts are integrated, namely, the first subassembly or the second subassembly, is attached to the stay supporting portions 45L and 45R of the vehicle body frame 11. Therefore, no dispersion occurs with the number of assembly steps on the main assembly line. As a result, the assembly productivity of the vehicle on the main assembly line can be improved.

Further, it is made possible to fasten two selected parts together to the stay members 19L and 19R, and the stay members 19L and 19R to which the various parts are fastened together are attached to the stay supporting portions 45L and 45R of the vehicle body frame 11. In other words, since the various parts are attached to the vehicle body frame 11 through the common stay members 19L and 19R, the number of types of the vehicle body frame 11 can be reduced and the vehicle cost can be reduced. In addition, it is not necessary to modify the main assembly line. Since the common stay members 19L and 19R are used, it is possible to flexibly cope with a change of the vehicle model. As a result, the productivity in assembly can be improved further.

Figure 7:
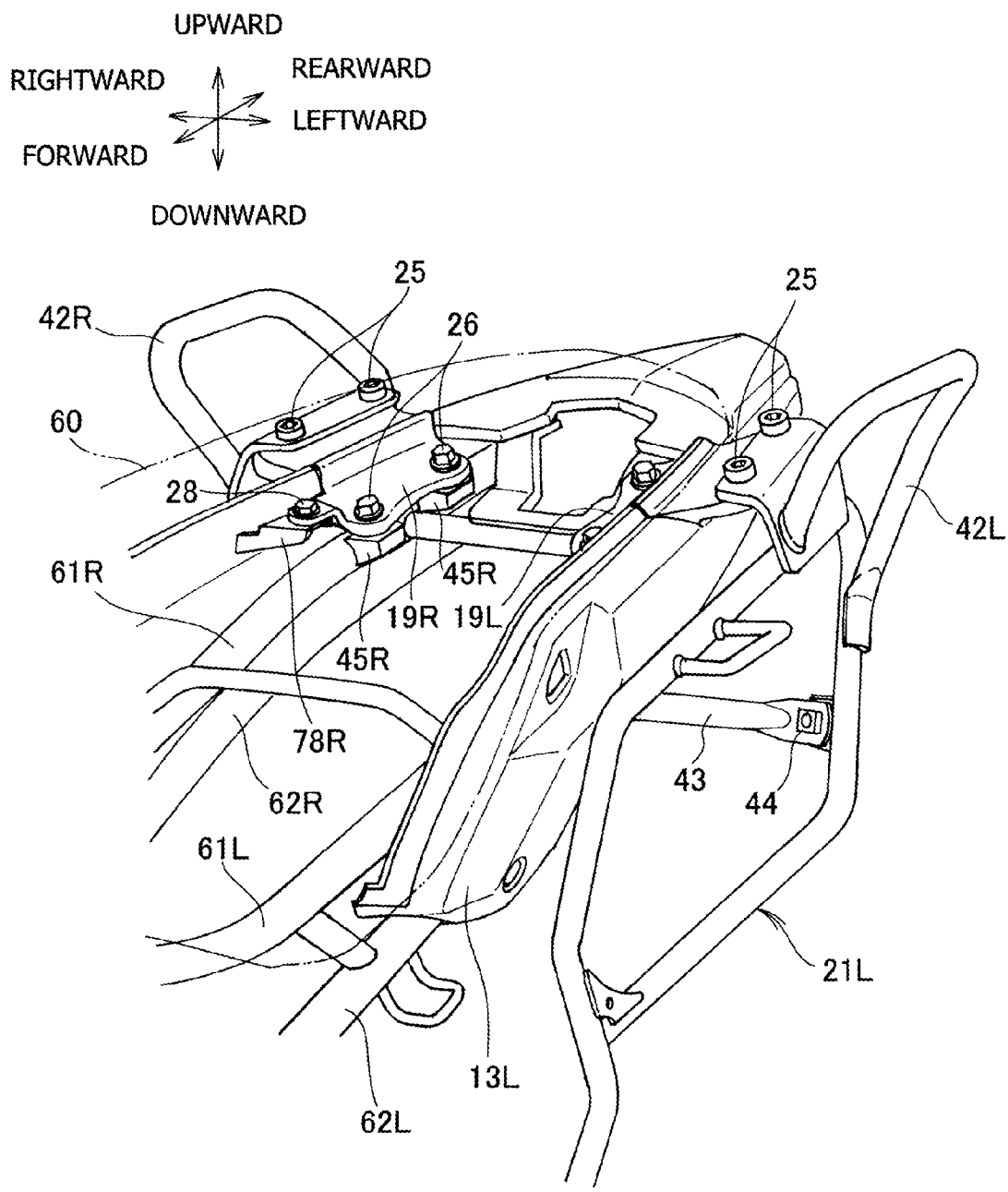
FIG. 7 is a perspective view of a rear portion of a motorcycle in which a side bag supporting member with which a grip member is integrated is provided (in a state in which a seat is removed).

Now, the third variation is described. As shown in FIG. 7, a vehicle body frame 11 (refer to FIG. 1) is provided at a rear portion of a motorcycle 10, and stay members 19L and 19R are attached to the vehicle body frame 11. Further, side bag supporting members 21L and 21R are attached to the stay members 19L and 19R. Rear cowls 13L and 13R, which cover the vehicle body frame 11, are disposed on the inner side of the side bag supporting members 21L and 21R on the outer side of the vehicle body frame 11.

Figure 8A:
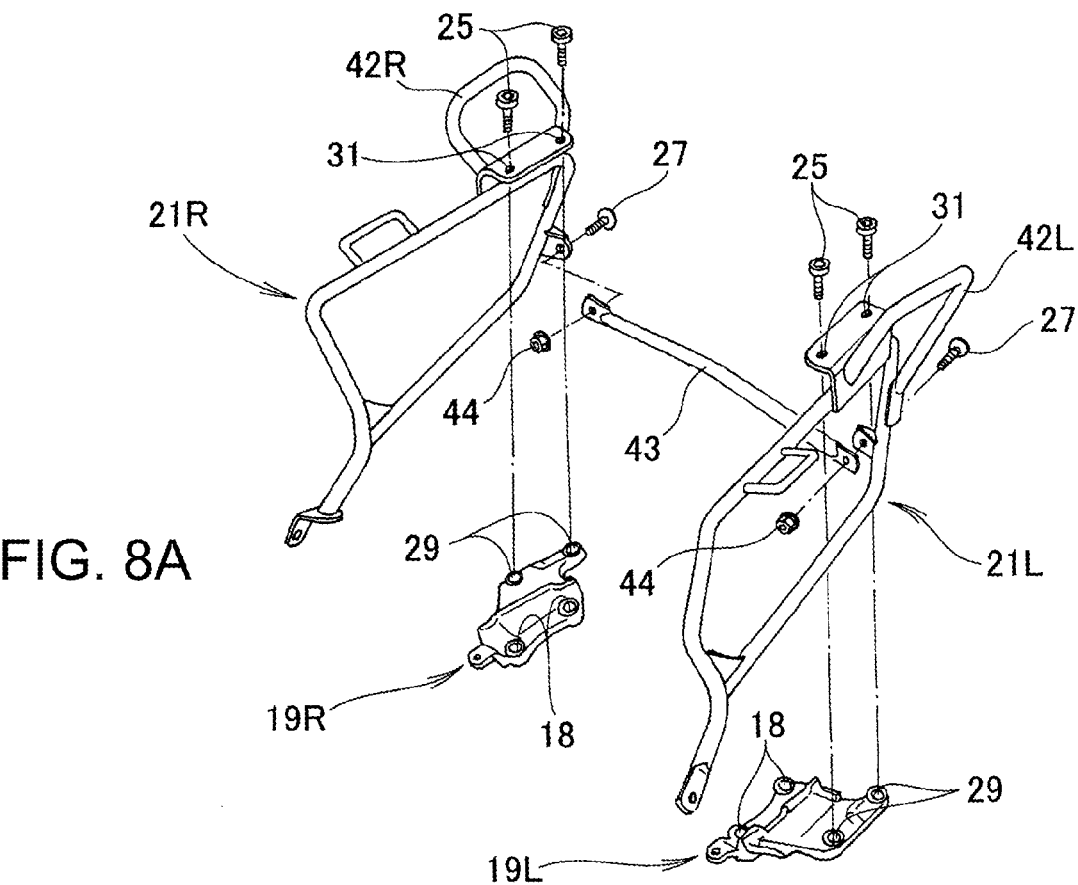
FIG. 8A is an exploded perspective view and FIG. 8B a perspective view illustrating that various parts are attached to a stay member to assemble a third subassembly.
Figure 8B:
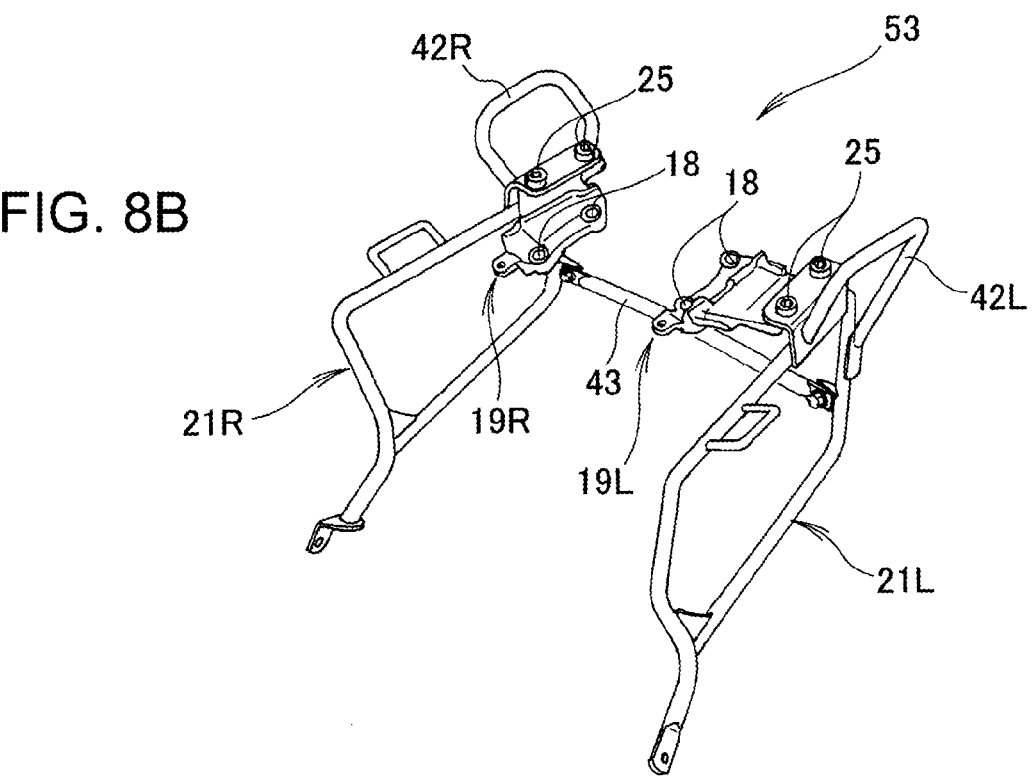

FIG. 8A is an exploded perspective view illustrating that the side bag supporting members 21L and 21R are to be attached to the stay members 19L and 19R, and FIG. 8B is a perspective view showing a third subassembly 53 wherein the side bag supporting members 21L and 21R are attached to the stay members 19L and 19R.

Referring to FIG. 8A, two front and rear first fastening holes 29 on each of which a female threaded portion is formed are provided on the stay members 19L and 19R, and second fastening holes 31 are provided in the side bag supporting members 21L and 21R in an aligned relationship with the positions of the first fastening holes 29. Two front and rear hole portions 18 to be attached to the vehicle body frame 11 are provided in each of the stay members 19L and 19R at an inner position in the vehicle widthwise direction with respect to the first fastening holes 29. Then, the side bag supporting members 21L and 21R are placed on the stay members 19L and 19R and the second fastening holes 31 are aligned with the first fastening holes 29, and then the side bag supporting members 21L and 21R are fastened to the stay members 19L and 19R from above by a plurality of fastening members 25.

Further, a cross stay 43, which connects the side bag supporting members 21L and 21R to each other, extends between the side bag supporting members 21L and 21R. The cross stay 43 is fastened at the opposite ends thereof to portions in the proximity of rear ends of the side bag supporting members 21L and 21R by fastening members 27 and nuts 44.

FIG. 8B illustrates that the side bag supporting members 21L and 21R, which are in a superposed relationship with each other, are fastened to the stay members 19L and 19R by a plurality of fastening members 25. In the following, the side bag supporting members 21L and 21R fastened together to the stay members 19L and 19R by the fastening members 25 are referred to as third subassembly 53.

Figure 9:
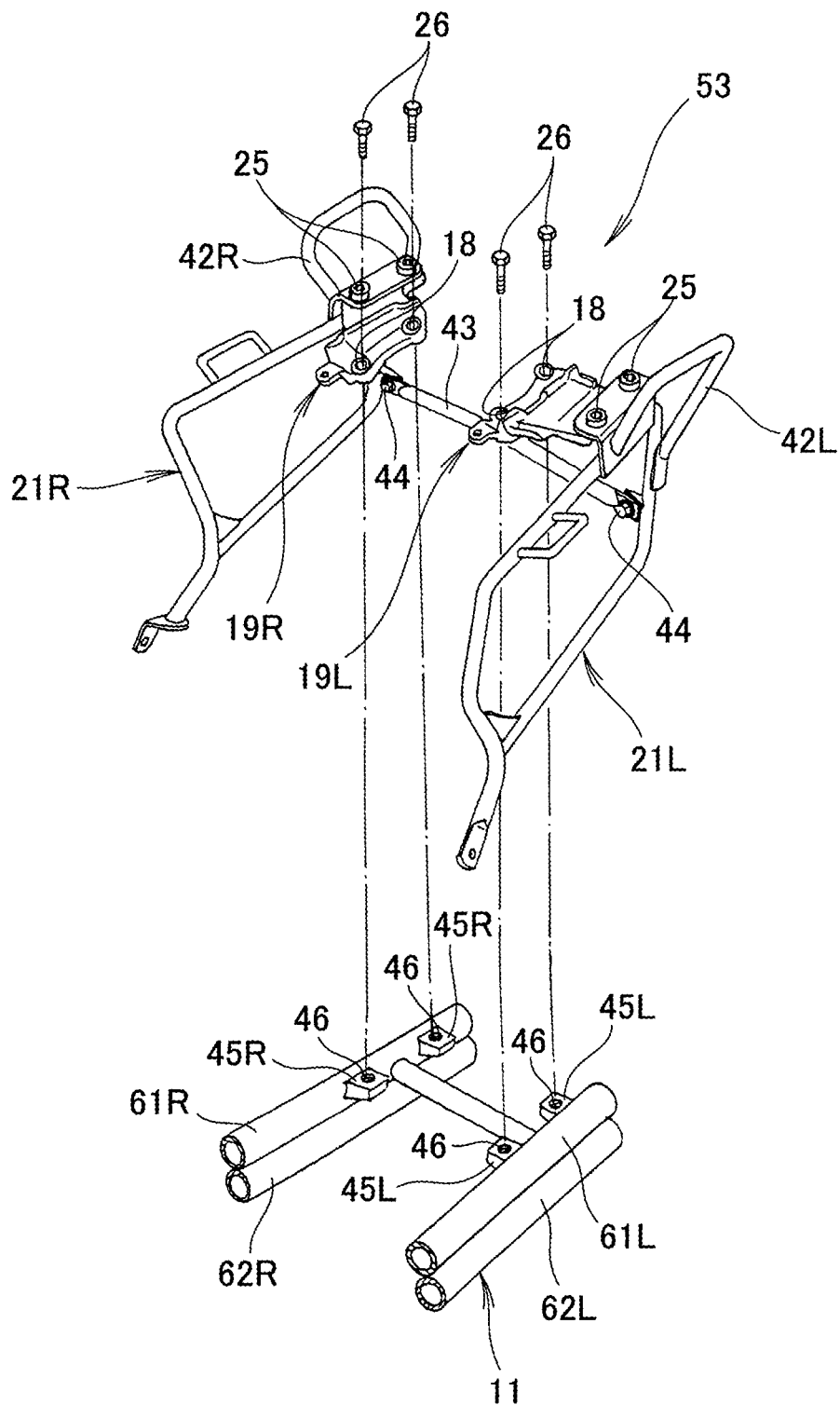
FIG. 9 is an exploded perspective view illustrating that the third subassembly assembled in FIG. 8B is attached to a stay supporting portion.

As shown in FIG. 9, stay fastening holes 46 are provided on each of stay supporting portions 45L and 45R in an aligned relationship with two front and rear hole portions 18 provided on each of the stay members 19L and 19R and to be attached to the vehicle body frame 11. A female threaded portion is formed on each of the stay fastening holes 46, and the hole portions 18 are aligned with the stay fastening holes 46 and the stay members 19L and 19R, to which the side bag supporting members 21L and 21R are fastened, are fastened to the stay supporting portions 45L and 45R by a plurality of fastening members 26.

It is to be noted that, while the grip members 42L and 42R are integrated with the side bag supporting members 21L and 21R, side bag supporting members 21L and 21R of a mode that does not include the grip members 42L and 42R may be used instead.

Figure 10:
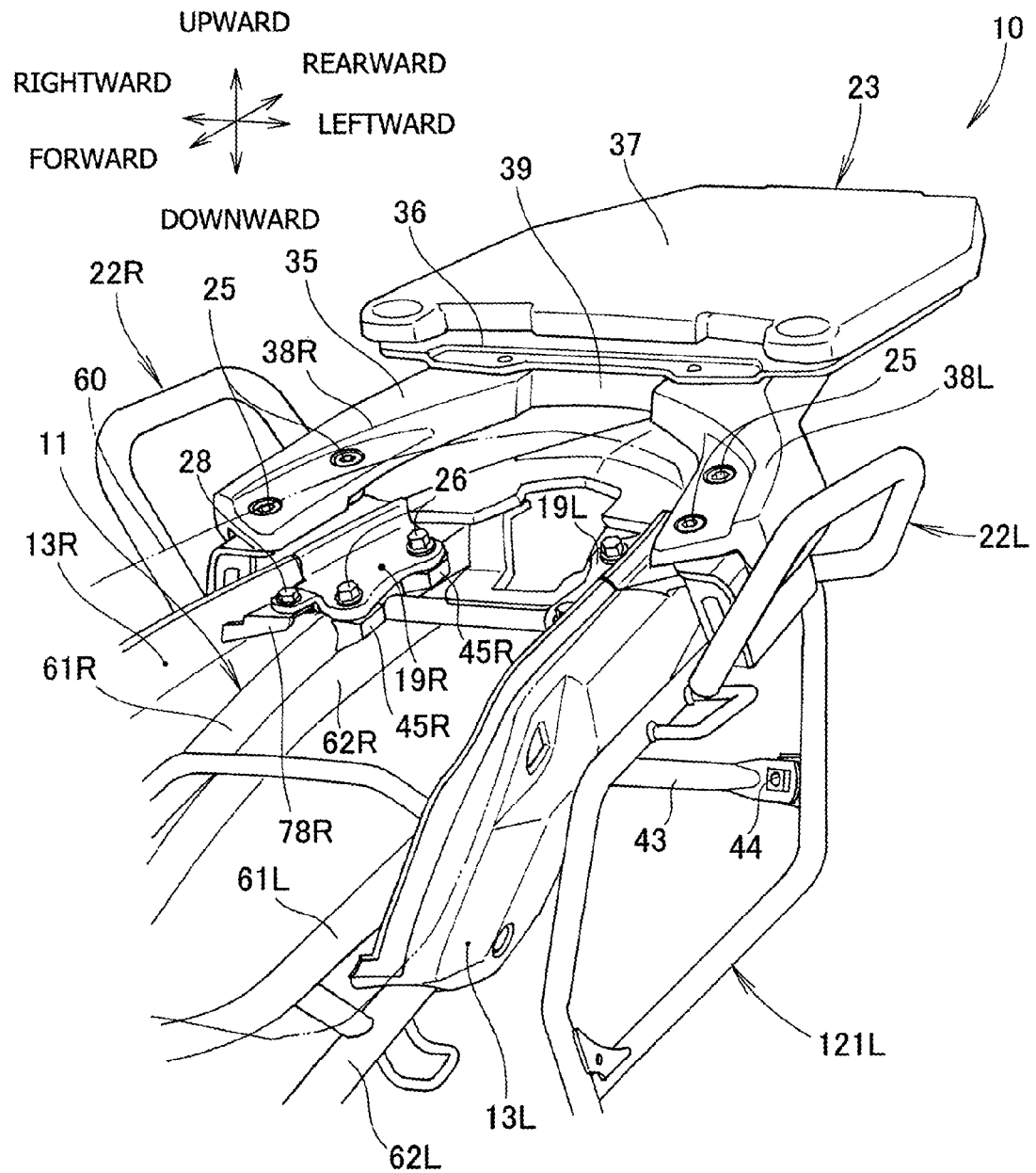
FIG. 10 is a perspective view of a rear portion of a motorcycle in which a side bag supporting member and a carrier member are provided (in a state in which the seat is removed).

Now, the fourth variation is described. As shown in FIG. 10, a vehicle body frame 11 is provided at a rear portion of a motorcycle 10, and stay members 19L and 19R are attached to the vehicle body frame 11. Side bag supporting members 121L and 121R, which are gripped by a passenger on the motorcycle and do not include a grip member, grips 22L and 22R which are gripped by the passenger on the motorcycle and a carrier member 23 are attached to the stay members 19L and 19R. Rear cowls 13L and 13R, which cover the vehicle body frame 11, are disposed on the inner side of the side bag supporting members 121L and 121R on the outer side of the vehicle body frame 11.

Figures 11A, 11B:
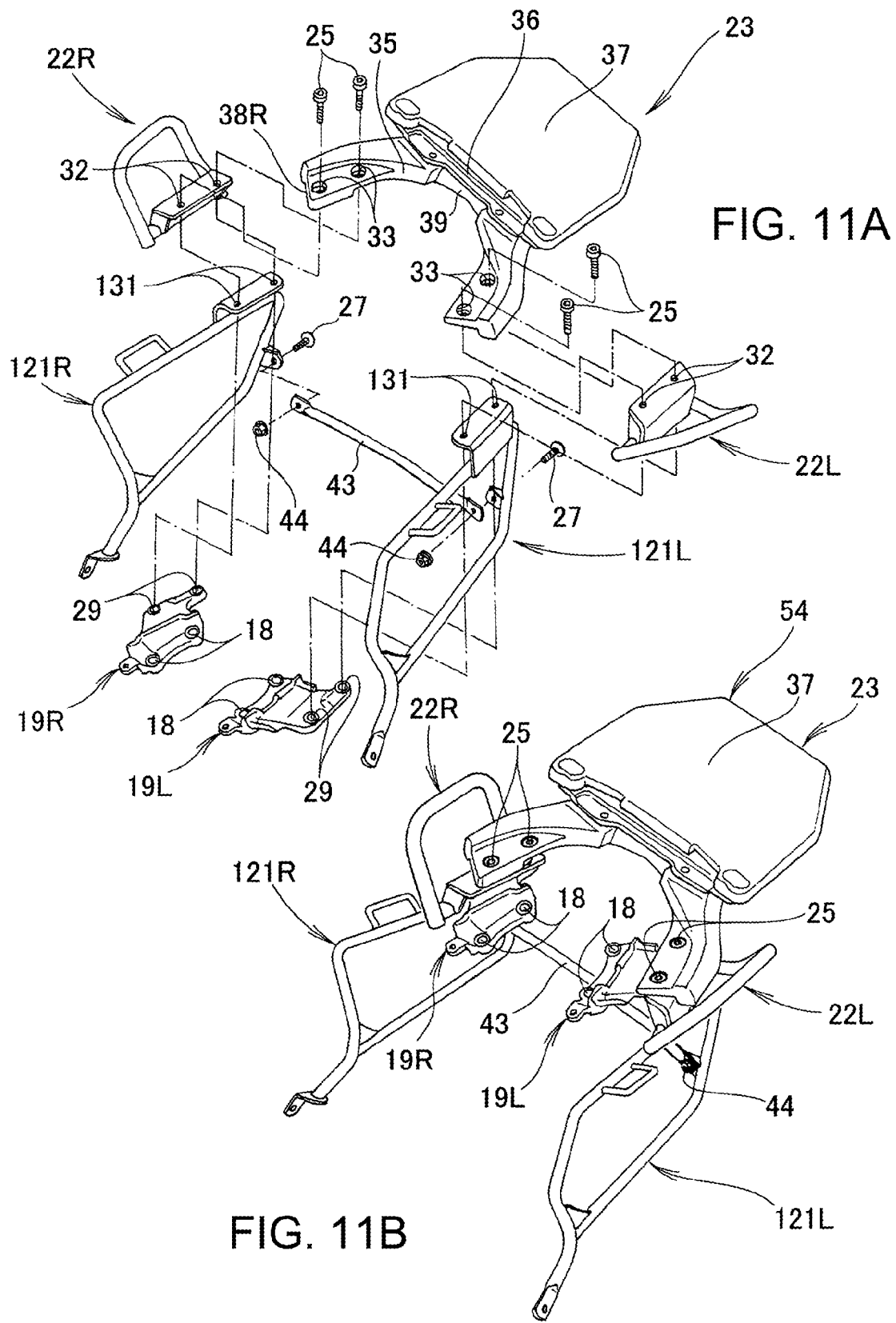
FIG. 11A is an exploded perspective view and FIG. 11B a perspective view illustrating that various parts are attached to a stay member to assemble a fourth subassembly.

FIG. 11A is an exploded perspective view illustrating that the stay members 19L and 19R, grips 22L and 22R and carrier member 23 are to be attached to the stay members 19L and 19R, and FIG. 11B is a perspective view showing a fourth subassembly 54 wherein the side bag supporting members 121L and 121R, grips 22L and 22R and carrier member 23 are attached to the stay members 19L and 19R.

Referring to FIG. 11A, two front and rear first fastening holes 29 on each of which a female threaded portion is formed are provided on each of the stay members 19L and 19R, and a plurality of second fastening holes 131 are provided on each of the side bag supporting members 121L and 121R in an aligned relationship with the positions of the first fastening holes 29. A plurality of third fastening holes 32 are provided on each of the grips 22L and 22R, and a plurality of carrier member fastening holes 33 are provided on the carrier member 23. Thus, the side bag supporting members 121L and 121R are placed on the stay members 19L and 19R, then the grips 22L and 22R are placed on the side bag supporting members 121L and 121R, and then the carrier member 23 is placed on the grips 22L and 22R. Thereafter, the second fastening holes 131, third fastening holes 32 and carrier member fastening holes 33 are aligned with the first fastening holes 29, and the side bag supporting members 121L and 121R, grips 22L and 22R and carrier member 23 are fastened to the stay members 19L and 19R from above by a plurality of fastening members 25.

Further, a cross stay 43 that connects the side bag supporting members 121L and 121R to each other extends between the side bag supporting members 121L and 121R. The cross stay 43 is fastened at the opposite end portions thereof to portions in proximity of rear ends of the side bag supporting members 121L and 121R by the fastening members 27 and the nuts 44.

FIG. 11B illustrates that the side bag supporting members 121L and 121R and grips 22L and 22R, which are in a state superposed with each other, are fastened to the stay members 19L and 19R by a plurality of fastening members 25. In the following, the side bag supporting members 121L and 121R, grips 22L and 22R and carrier member 23 are fastened together to the stay members 19L and 19R by the fastening members 25 are referred to as fourth subassembly 54.

Figure 12:
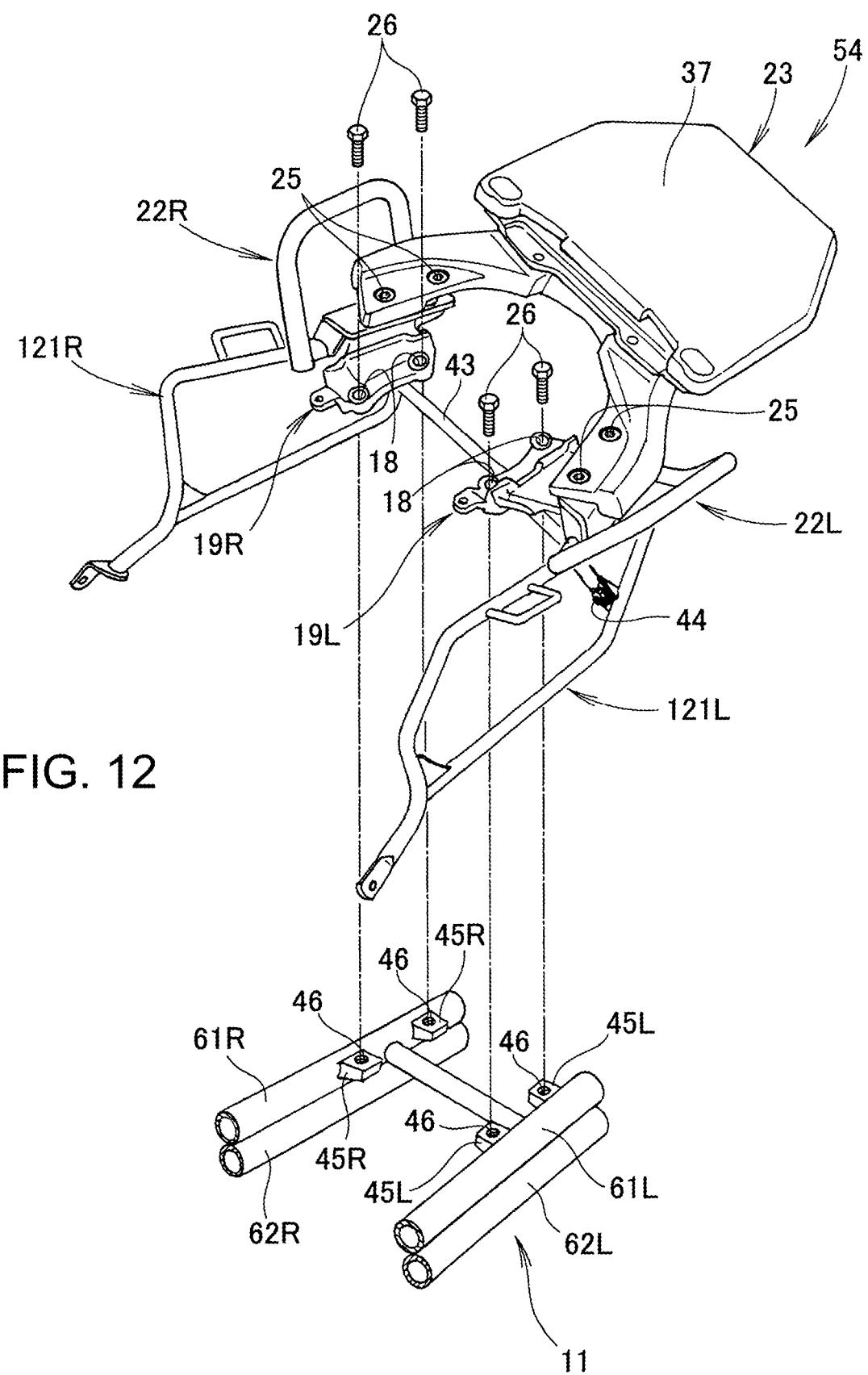
FIG. 12 is an exploded perspective view illustrating that the fourth subassembly assembled in FIG. 11B is attached to a stay supporting portion.

As shown in FIG. 12, two front and rear hole portions 18 to be attached to the vehicle body frame 11 are provided on each of the stay members 19L and 19R at an inner position in the vehicle widthwise direction with respect to the first fastening holes 29. Stay fastening holes 46 are provided on the stay supporting portions 45L and 45R in an aligned relationship with the hole portions 18. A female threaded portion is formed on each of the stay fastening holes 46, and the hole portions 18 are aligned with the stay fastening holes 46 and the stay members 19L and 19R, to which the side bag supporting members 121L and 121R are fastened, are fastened to the stay supporting portions 45L and 45R.

Referring to FIGS. 2, 5, 8 and 11, in the present working example, the side bag supporting members 21L and 21R with which the grip members 42L and 42R are integrated and the carrier member 23 are fastened to the stay members 19L and 19R with the second fastening holes 31 of the side bag supporting members 21L and 21R and the carrier member fastening holes 33 of the carrier member 23 aligned with the first fastening holes 29 of the stay members 19L and 19R. Or, the grips 22L and 22R and the carrier member 23 are fastened to the stay members 19L and 19R with the third fastening holes 32 of the grips 22L and 22R and the carrier member fastening holes 33 of the carrier member 23 aligned with each other; the side bag supporting members 21L and 21R are fastened to the stay members 19L and 19R with the second fastening holes 31 of the side bag supporting members 21L and 21R aligned with the first fastening holes 29 of the stay members 19L and 19R; or the side bag supporting members 121L and 121R, which do not include a grip member, the grips 22L and 22R and the carrier member 23, are fastened to the stay members 19L and 19R with the second fastening holes 131 of the side bag supporting members 121L and 121R, third fastening holes 32 of the grips 22L and 22R and carrier member fastening holes 33 of the carrier member 23 aligned with the first fastening holes 29 of the stay members 19L and 19R. Further, there is no problem if the side bag supporting members 121L and 121R, carrier member 23 and grips 22L and 22R are fastened to the stay members 19L and 19R with the second fastening holes 131 of the side bag supporting members 121L and 121R and carrier member fastening holes 33 of the carrier member 23 aligned with each other. Or, the second fastening holes 31, second fastening holes 131 or third fastening holes 32 may be aligned with the first fastening holes to fasten the corresponding members to the stay members 19L and 19R.

In the present invention, after various parts are subassembled to the stay members 19L and 19R, the stay members 19L and 19R to which the various parts are subassembled are fastened to the stay supporting portions 45L and 45R of the vehicle body frame 11 on a main assembly line. Therefore, a dispersion becomes less likely to occur with the assembly step on the main assembly line. As a result the productivity in assembly can be improved. Further, since the various parts are attached to the stay supporting portions 45L and 45R through the common stay members 19L and 19R, even if the number of vehicle models increases, a significant modification of the line is not required.

Further, since the positions of the fastening holes (hole portions 18) of the stay members 19L and 19R are aligned with the positions of the fastening holes (stay fastening holes 46) of the stay supporting portions 45L and 45R, there is no necessity to change the vehicle body frame 11 for each of the various parts. As a result, increase of the number of types of the vehicle body frame can be suppressed and the vehicle cost can be reduced. Further, the common stay members 19L and 19R are used, and the various parts are subassembled to the stay members 19L and 19R in advance and then the subassembled stay members 19L and 19R are fastened to the stay supporting portions 45L and 45R. Therefore, the change in steps is unnecessary or small with respect to a change of the vehicle model, and consequently, it is facilitated to cope with a change of the vehicle model.

It is to be noted that the side bag supporting members may be of the type wherein the grip members 42L and 42R are integrated therewith.

Figure 13:
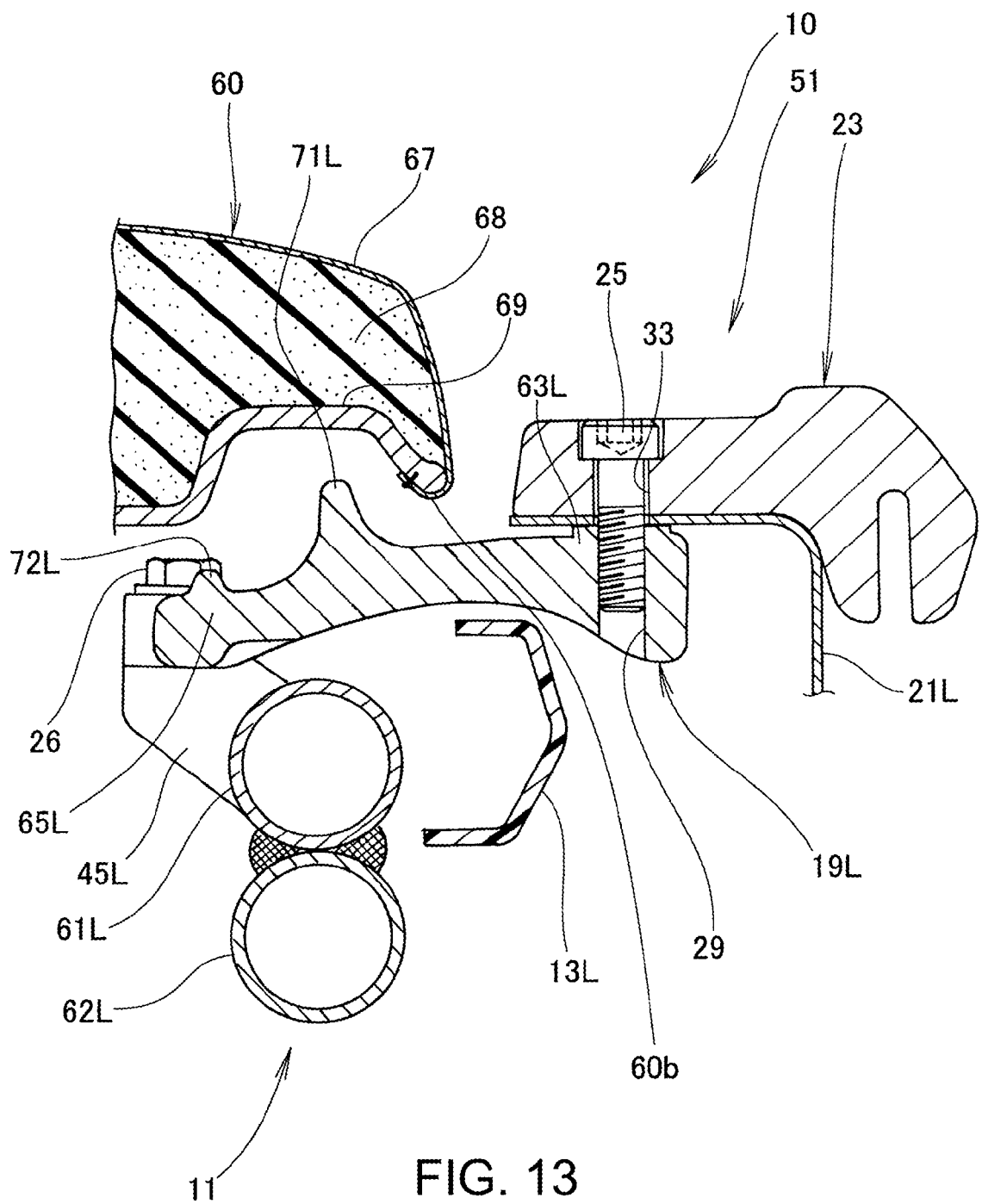
FIG. 13 is a sectional view taken along line 13-13 of FIG. 1.

As shown in FIG. 13, the motorcycle 10 as a saddle type vehicle includes a seat rail 61L, which is a component of the vehicle body frame 11, a seat 60 attached to the seat rail 61L and capable of supporting a rider and a passenger, and a stay supporting portion 45L provided on the seat rail 61L below the seat 60. The stay supporting portion 45L supports a stay member 19L, and a side bag supporting member 21L and a carrier member 23 are fastened together to the stay member 19L and fastened to the stay supporting portion 45L.

The seat 60 includes a bottom plate 69, a cushion section 68 disposed on an upper face of the bottom plate 69, and a seat skin 67 integrated with the bottom plate 69 so as to cover the cushion section 68.

The stay member 19L attached to the vehicle body frame 11 extends outwardly in the vehicle widthwise direction farther than the seat 60, and when the seat 60 is removed, the stay supporting portion 45L is open upwardly.

Referring to FIG. 13, immediately below the seat rail 61L, a support frame 62L that supports the seat rail 61L is fixed to a lower end of the seat rail 61L and extends along the seat rail 61L. A rear cowl 13L is disposed outwardly in the vehicle widthwise direction of the seat rail 61L. In other words, a structure when the first subassembly 51 is attached to the stay member 19L is shown.

It is to be noted that the structure of the stay member 19L to which various parts including the second subassembly and the third subassembly are fastened and the vehicle body frame 11 side to which the stay member 19L is attached is same as the structure when the first subassembly 51 is attached, and description thereof is omitted.

Figure 14:
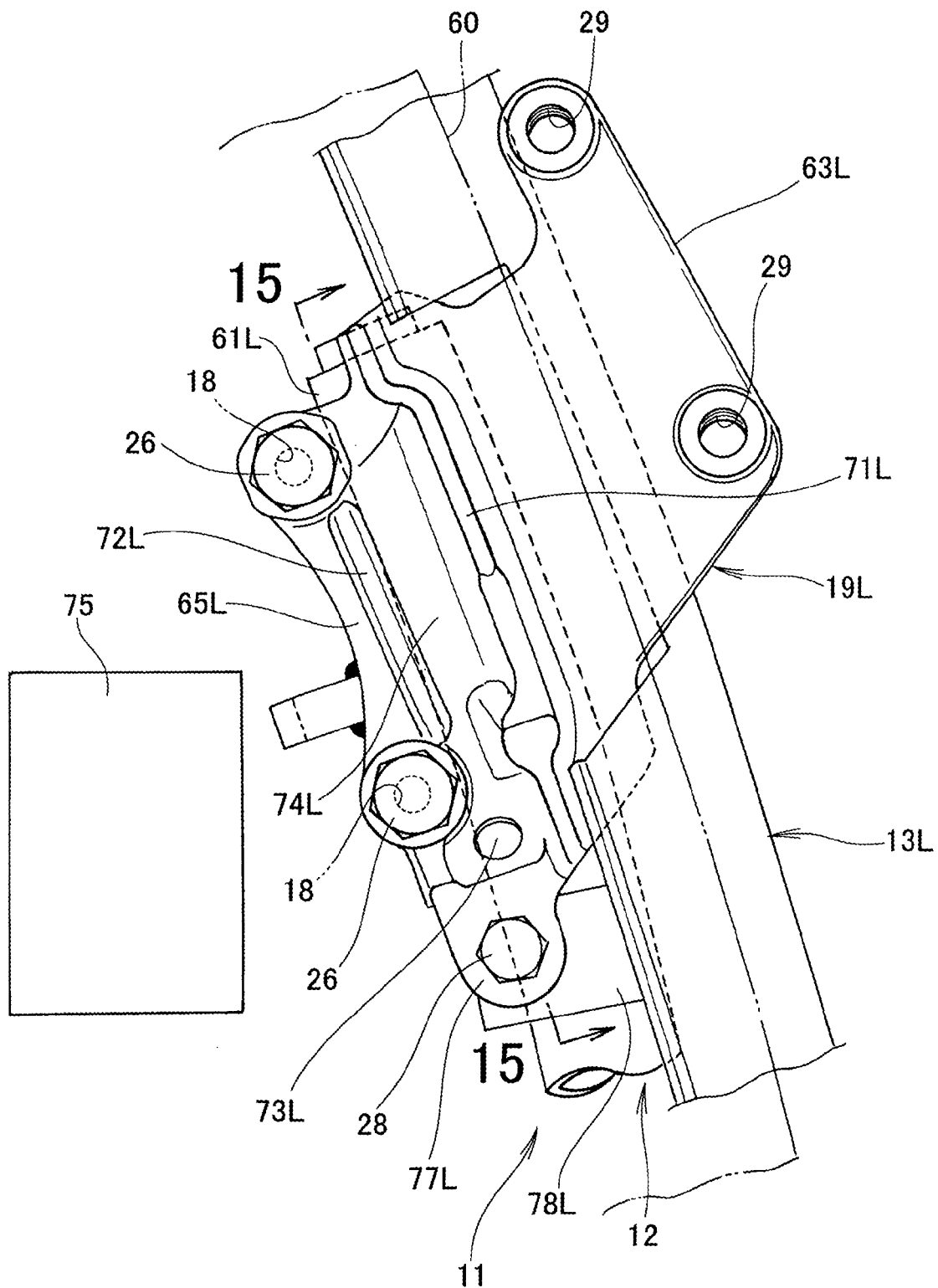
FIG. 14 is a plan view of a stay member fastened to a stay supporting portion.

As shown in FIG. 14, the stay member 19L is a forged steel member extending horizontally. The stay member 19L includes an outer side portion 63L positioned outwardly in the vehicle widthwise direction farther than the seat 60 as viewed in plan. The outer side portion 63L is disposed between the seat 60 and the rear cowl 13L, which covers a side of a rear portion of the vehicle body frame 11, in the heightwise direction. In FIG. 14, the subassembly is removed. It is to be noted that such stay members, vehicle body frames and so forth are provided leftwardly and rightwardly in pairs across the center line in the vehicle widthwise direction.

Referring also to FIG. 13, two front and rear hole portions 18 fastened to the stay supporting portion 45L are provided on the stay member 19L. Below the seat 60, a first rib 71L, which extends along the forward-rearward direction of the vehicle body frame 11 and projects upwardly with respect to a lower end 60b of a side portion in the vehicle widthwise direction of the seat 60, is formed integrally on the stay member 19L. A second rib 72L extending so as to connect the two front and rear hole portions 18 to each other is formed on an inner side portion 65L of the stay member 19L in the forward and backward direction of the vehicle body on the inner side in the vehicle widthwise direction with respect to the first rib 71L.

The first rib 71L and the second rib 72L extend along the extending direction of the seat rail 61L. A valley portion 74L in the form of a flat face is provided between the first rib 71L and the second rib 72L. By the first rib 71L and the second rib 72L, water entering from the outside of the vehicle body can be prevented from reaching an electrical component 75.

The stay member 19L is a forged steel member extending horizontally and is disposed between the seat 60 and the rear cowl 13L. By disposing the stay member 19L extending horizontally between the seat 60 and the rear cowl 13L, the seat 60 can be disposed closely to the rear cowl 13L and the height of the seat 60 can be maintained or suppressed low. In addition, by disposing the seat 60 nearly to the rear cowl 13L, the gap between the seat 60 and the rear cowl 13L becomes small, and water becomes difficult to enter the inside of the vehicle body. As a result, the height of the seat 60 is maintained or suppressed low and water becomes difficult to enter the inside of the vehicle body.

Further, when the seat 60 is removed, since the stay supporting portion 45L is open upwardly, a fastening tool can be moved toward the stay supporting portion 45L from above. Accordingly, with the stay supporting portion 45L open upwardly, the stay member 19L to which various parts are fastened together can be attached readily to the stay supporting portion 45L.

In an alternative structure wherein the top of the stay supporting portion 45L is not open and is covered, after the various parts are assembled to the stay member 19L, with the various parts, upon attachment, any subassembly stands in the way and a work for assembling the subassembly to the vehicle body frame is likely to become difficult to be carried out smoothly. In addition, there is the possibility that, depending upon the structure of the subassembly, a work to assemble the subassembly to the vehicle body frame may become difficult.

In this regard, according to the present invention, since the stay supporting portion 45L is open upwardly, a fastening tool can be moved toward the stay supporting portion 45L from above. As a result, the productivity in assembly can be improved.

Further, the second rib 72L extending between the two hole portions 18 on the inner side in the vehicle widthwise direction with respect to the first rib 71L is formed on the inner side of the stay member 19L. Since the second rib 72L extends so as to connect the two hole portions 18 to each other, even if water passes over the first rib 71L, water entering into the inner side of the vehicle body can be stopped by the second rib 72L. By this second rib 72L, water entering into the inner side of the vehicle body can be prevented with a higher degree of certainty.

Figure 15:
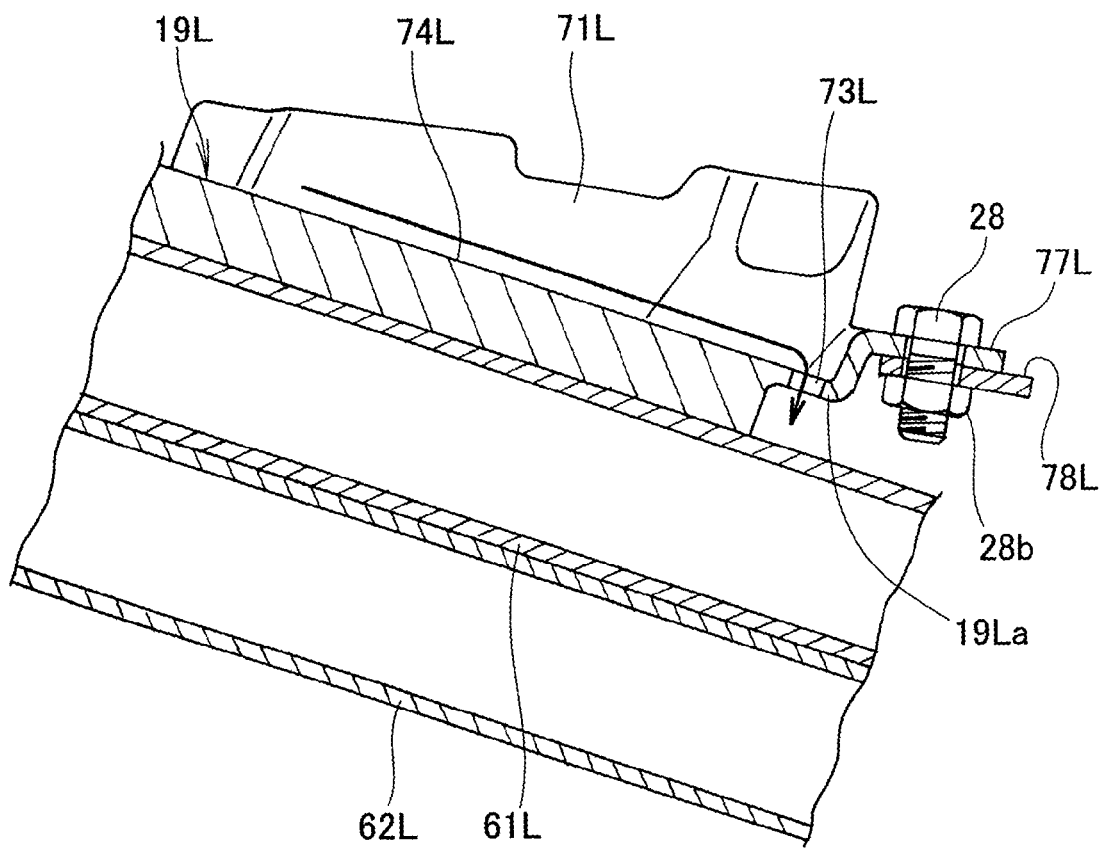
FIG. 15 is a sectional view taken along line 15-15 of FIG. 14.

As shown in FIG. 15, the stay member 19L is disposed in a state in which it is negatively inclined when extending toward a front of the vehicle body frame, and a drain hole 73L, which is disposed to discharge water in the inner side of the stay member in the vehicle widthwise direction with respect to the first rib 71L, is perforated at a front portion 19La of the stay member 19L.

Since the stay member 19L is negatively inclined when extending toward the front of the vehicle body frame and the drain hole 73L is provided at the front portion 19La of the stay member 19L, even if water entering from the outside of the vehicle body passes over the first rib 71L, the water flows forwardly downwardly along the slope and is discharged from the drain hole 73L. As a result, the water passing over the first rib 71L can be discharged readily.

Now, a supporting structure for the rear cowl 13L is described.

An inner side flange 78L of the rear cowl 13L is abutted with a lower face of a front end flange 77L provided at a front end of the stay member 19L, and the rear cowl 13L is attached to the stay member 19L by a fastening member 28 and a nut 28b.

Referring to FIGS. 16 to 19, details of the side bag supporting members 21L and 21R and the side bags 24L and 24R supported on the side bag supporting members 21L and 21R are described.

Figure 16:
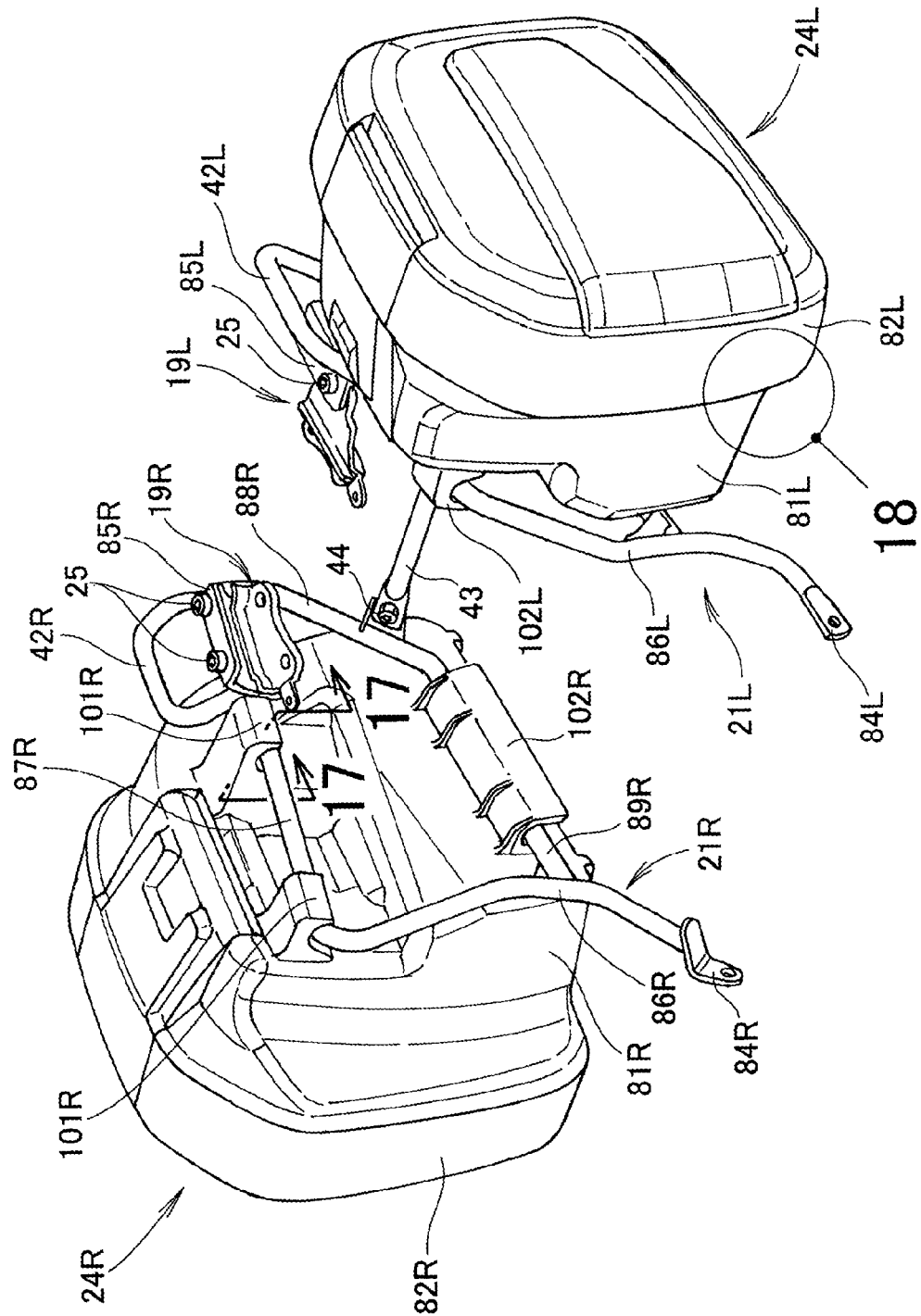
FIG. 16 is a perspective view of the third subassembly to which a side bag is attached.

As shown in FIG. 16, left and right side bags 24L and 24R are mounted individually on left and right side bag supporting members 21L and 21R, which configure the third subassembly 53 described hereinabove. The left and right side bags 24L and 24R are configured from container portions 81L and 81R, and lid portions 82L and 82R, which cover the container portions 81L and 81R, respectively.

In the following, the right side bag supporting member 21R is described. The structure of the left side bag supporting member 21L is configured symmetrically to the right side bag supporting member 21R with respect to the center line in the vehicle widthwise direction, and therefore, description of the same is omitted.

The right side bag supporting member 21R includes, as principal components thereof, a front arm 86R having, at a lower end thereof, a first stay portion 84R to be attached to the vehicle body frame 11 and extending substantially upwardly from the first stay portion 84R, and an upper arm 87R extending rearwardly in the forward and backward direction of the vehicle changing the direction from an upper end of the front arm 86R. The right side bag supporting member 21R further includes a rear arm 88R extending substantially downwardly changing the direction from a rear end of the upper arm 87R, a lower arm 89R extending forwardly of the vehicle changing the direction from a lower end of the rear arm 88R and connected to the front arm 86R, and a second stay 85R fixed to a vehicle rear portion of the upper arm 87R and serving as a seat to be fastened to the stay member 19R. The right side bag supporting member 21R further includes a grip portion 42R extending upwardly from the second stay 85R, further extending rearwardly of the vehicle, further extending downwardly and connected to an intermediate portion of the rear arm 88R.

Further, an upper stay supporting portion 101R of the side bag 24R is hung on the upper arm 87R, and a lower stay supporting portion 102R of the side bag 24R is hung on the lower arm 89R. Further, the side bag 24R is removably supported on the side bag supporting member 21R.

Figure 17:
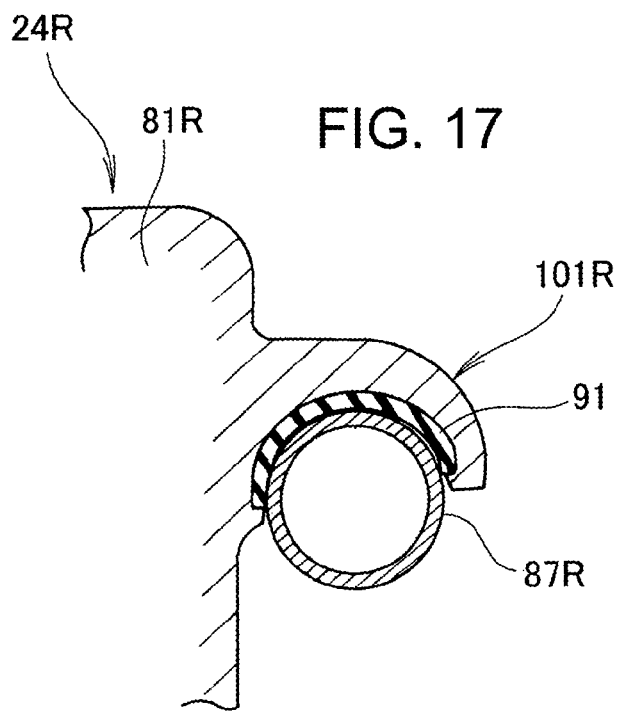
FIG. 17 is a sectional view taken along line 17-17 of FIG. 16.

As shown in FIG. 17, the upper stay supporting portion 101R is locked on a pipe-shaped stay (upper arm 87R) through an elastic member 91. In FIG. 16, also the lower stay supporting portion 102R is locked on a pipe-shaped stay (lower arm 89R) below an elastic member (not shown) through the elastic member. By interposing the elastic members on the lower stay supporting portion 102R and the upper stay supporting portion 101R, vibration of the side bag supporting member 21R provided on the vehicle body frame (reference numeral 11 in FIG. 1) side becomes less likely to be transmitted to the side bag 24R. Consequently, vibration can be suppressed favorably.

The side bag 24R includes an upper stay supporting portion 101R and a lower stay supporting portion 102R, which are locked to the vehicle body side. With the side bag 24R having the upper stay supporting portion 101R and the lower stay supporting portion 102R, it can be incorporated also in a vehicle, which has a pipe-shaped stay at one of upper and lower portions. In addition, the side bag 24R can be incorporated also in a vehicle of the type that does not have a pipe-shaped stay but rather has a side bag attaching hole, for example, in a rear cowl.

Now, a structure of a fitting portion between the container portion 81L and the lid portion 82L of the side bag 24L is described. Although description of the structure of the left side bag 24L is given below, the structure of the right side bag 24R is symmetrical with the structure of the left side bag 24L relative to a center line in the vehicle widthwise direction and also operation is similar. Therefore, description of the right side bag 24R is omitted.

Figure 18:
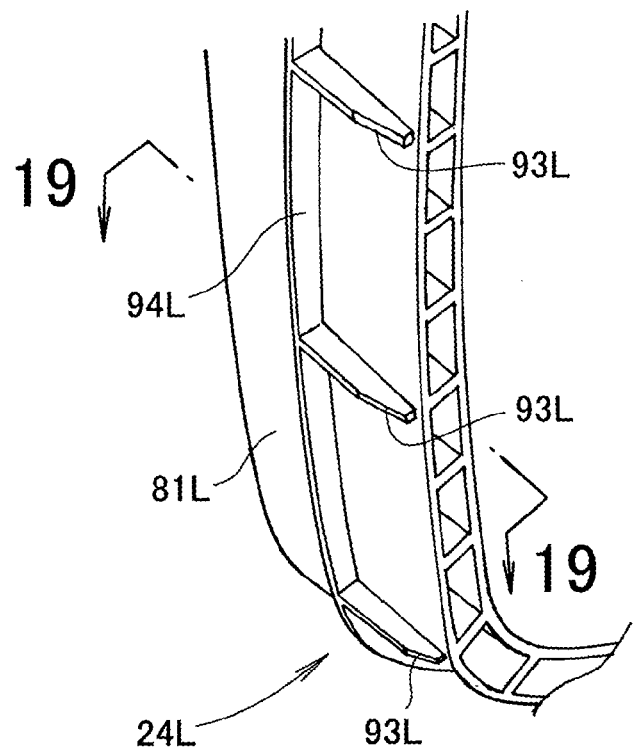
FIG. 18 is an enlarged view of a portion denoted by 18 in FIG. 16 (in a state in which a lid member is removed).
Figure 19:
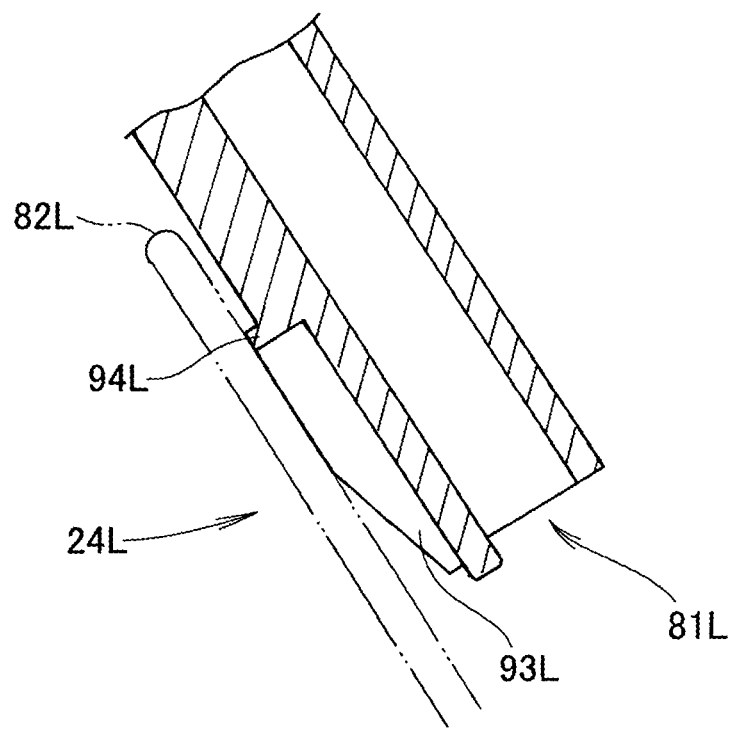
FIG. 19 is a sectional view taken along line 19-19 of FIG. 18.

As shown in FIGS. 18 and 19, a plurality of vertical ribs 93L by which the lid portion 82L is smoothly guided and fitted into the container portion 81L extend on the container portion 81L in a direction in which the lid portion 82L, which configures the side bag 24L, is fitted. A horizontal rib 94L, which prevents water from entering, extends in a direction perpendicular to the direction in which the vertical ribs 93L extend.

The container portion 81L, which configures the side bag 24L, includes the vertical ribs 93L and the horizontal rib 94L, which extends in a direction perpendicular to the vertical ribs 93L. Since the vertical ribs 93L are provided in a direction that is the same as the direction in which the lid portion 82L is opened and closed, when the lid portion 82L is fitted into (closed to) the container portion 81L, the inner face of the lid portion 82L slips along the vertical ribs 93L. Consequently, the lid portion 82L can be fitted smoothly into the container portion 81L. Further, since the horizontal rib 94L is provided, it is difficult for water to enter the vessel beyond the horizontal rib 94L, and it is difficult for water to enter the container portion 81L.

It is to be noted that, while the present invention is applied, in the embodiment, to a motorcycle, it can be applied also to a saddle type three-wheeled vehicle, and there is no problem if it is applied to a general saddle type vehicle.

The present invention is suitably applied to a motorcycle wherein various parts are provided at a rear portion of the vehicle through a stay member.

DESCRIPTION OF REFERENCE SYMBOLS

10 . . . Saddle type vehicle (motorcycle), 11 . . . Vehicle body frame, 13L, 13R . . . Rear cowl, 18 . . . Hole portion, 19L, 19R . . . Stay member, 21L, 21R . . . Side bag supporting member with which grip portion is integrated, 22L, 22R . . . Grip, 23 . . . Carrier member, 24L, 24R . . . Side bag, 25 . . . Fastening member, 29 . . . First fastening hole, 31 . . . Second fastening hole, 32 . . . Third fastening hole, 33 . . . Carrier member fastening hole, 42L, 42R . . . Grip portion, 45L, 45R . . . Stay supporting portion, 60 . . . Seat, 63L, 63R . . . Outer side portion, 71L, 71R . . . First rib, 72L, 72R . . . Second rib, 73L, 73R . . . Drain hole, 81L, 81R . . . Container portion, 82L, 82R . . . Lid portion, 91 . . . Elastic member, 93L, 93R . . . Vertical rib, 94L, 94R . . . Horizontal rib, 101L, 101R . . . Upper stay supporting portion, 102L, 102R . . . Lower stay supporting portion, 121L, 121R . . . Side bag supporting member, 131 . . . Second fastening hole.

What is claimed is:

1. A rear portion structure for a saddle type vehicle which includes a vehicle body frame, a seat attached to the vehicle body frame and capable of supporting a rider and a passenger, and a stay supporting portion provided on the vehicle body frame underneath the seat and supporting a stay member thereon, and various parts being attached to the stay member, wherein the various parts include a side bag supporting member with an integrated grip portion for being gripped by the passenger on the vehicle and which supports a side bag, and a carrier member for supporting luggage;

a first fastening hole is formed in the stay member;

a second fastening hole is formed in the side bag supporting member;

a carrier member fastening hole is formed in the carrier member;

the stay member extends outwardly in a vehicle widthwise direction a first distance while said seat extends outwardly in the vehicle widthwise direction a second distance, said first distance being greater than said second distance; and at least one of the second fastening hole and the carrier member fastening hole are aligned with the first fastening hole, and at least one part from a group including the side bag supporting member and the carrier member is fastened to the stay member by a fastening member.

2. The rear portion structure for a saddle type vehicle according to claim 1, wherein the stay member is a forged steel part extending horizontally and includes an outer side portion positioned outwardly in the vehicle widthwise direction farther than the seat, and is disposed between the seat and a rear cowl that covers a side of a rear portion of the vehicle body frame; and wherein, when the seat is removed, the stay supporting portion is open upwardly.

3. The rear portion structure for a saddle type vehicle according to claim 2, wherein two front and rear hole portions are fastened to the stay supporting portion and are provided on the stay member;

wherein said stay member includes first and second ribs, said first rib extending in a forward-rearward direction of the vehicle body frame below the seat and projecting upwardly with respect to a lower end of a side portion of the seat in the vehicle widthwise direction; and the second rib is formed at an inner side portion of said stay member relative to said second rib and extends so as to connect the two front and rear hole portions to each other.

4. The rear portion structure for a saddle type vehicle according to claim 3, wherein the stay member is disposed so as to be negatively inclined when extending toward a front of the vehicle body frame, and a drain hole disposed on an inner side of the stay member in the vehicle widthwise direction with respect to the first rib for discharging water therethrough is formed in a front portion of the stay member.

5. The rear portion structure for a saddle type vehicle according to claim 1, wherein two front and rear hole portions are fastened to the stay supporting portion and are provided on the stay member;

wherein said stay member includes first and second ribs, said first rib extending in a forward-rearward direction of the vehicle body frame below the seat and projecting upwardly with respect to a lower end of a side portion of the seat in the vehicle widthwise direction; and the second rib is formed at an inner side portion of said stay member relative to said second rib and extends so as to connect the two front and rear hole portions to each other.

6. The rear portion structure for a saddle type vehicle according to claim 5, wherein the stay member is disposed so as to be negatively inclined when extending toward a front of the vehicle body frame, and a drain hole disposed on an inner side of the stay member in the vehicle widthwise direction with respect to the first rib for discharging water therethrough is formed in a front portion of the stay member.

7. The rear portion structure for a saddle type vehicle according to claim 5, wherein the side bag supporting member includes a pair of upper and lower pipe-shaped stays extending in a forward and rearward direction of the vehicle;

the side bag includes an upper stay supporting portion and a lower stay supporting portion locked from above to the upper and lower pipe-shaped stays, respectively; and the upper stay supporting portion and the lower stay supporting portion are locked by the upper and lower pipe-shaped stays, respectively, with elastic members interposed therebetween.

8. The rear portion structure for a saddle type vehicle according to claim 1, wherein the side bag supporting member includes upper and lower pipe-shaped stays extending in a forward and rearward direction of the vehicle;

the side bag includes an upper stay supporting portion and a lower stay supporting portion locked from above to the upper and lower pipe-shaped stays, respectively; and the upper stay supporting portion and the lower stay supporting portion are locked by the upper and lower pipe-shaped stays, respectively, with elastic members interposed therebetween.

9. The rear portion structure for a saddle type vehicle according to claim 2, wherein the side bag supporting member includes upper and lower pipe-shaped stays extending in a forward and rearward direction of the vehicle;
- the side bag includes an upper stay supporting portion and a lower stay supporting portion locked from above to the upper and lower pipe-shaped stays, respectively; and
- the upper stay supporting portion and the lower stay supporting portion are locked by the upper and lower pipe-shaped stays, respectively, with elastic members interposed therebetween.

10. The rear portion structure for a saddle type vehicle according to claim 1, wherein the side bag includes a container portion and a lid portion which covers the container portion; and
- said container portion including a plurality of vertical ribs and a horizontal rib, said vertical ribs extending in a direction in which the lid portion is opened and closed and serving to guide the lid portion, said horizontal rib serving to prevent water from entering in a direction perpendicular to the direction in which the vertical ribs extend.

11. The rear portion structure for a saddle type vehicle according to claim 2, wherein the side bag includes a container portion and a lid portion which covers the container portion; and
- said container portion including a plurality of vertical ribs and a horizontal rib, said vertical ribs extending in a direction in which the lid portion is opened and closed and serving to guide the lid portion, said horizontal rib serving to prevent water from entering in a direction perpendicular to the direction in which the vertical ribs extend.

12. A rear portion structure for a saddle type vehicle which includes a vehicle body frame, a seat attached to the vehicle body frame and capable of supporting a rider and a passenger, and a stay supporting portion provided on the vehicle body frame underneath the seat and supporting a stay member thereon, and various parts being attached to the stay member, wherein
- the various parts include at least two parts selected from a group including a side bag supporting member for supporting a side bag, a grip for being gripped by the passenger on the vehicle and a carrier member for supporting luggage;
- a first fastening hole is formed in the stay member;
- a second fastening hole is formed in the side bag supporting member;
- a third fastening hole is formed in the grip;
- a carrier member fastening hole is formed in the carrier member;
- the stay member extends outwardly in a vehicle widthwise direction a first distance while said seat extends outwardly in the vehicle widthwise direction a second distance, said first distance being greater than said second distance; and
- at least two holes selected from a group including the second fastening hole, third fastening hole and carrier member fastening hole are aligned with the first fastening hole, and at least two parts selected from a group including the side bag supporting member, the grip, and the carrier member, are fastened together to the stay member.

13. The rear portion structure for a saddle type vehicle according to claim 12, wherein the stay member is a forged steel part extending horizontally and includes an outer side portion positioned outwardly in the vehicle widthwise direction farther than the seat, and is disposed between the seat and a rear cowl that covers a side of a rear portion of the vehicle body frame; and
- wherein, when the seat is removed, the stay supporting portion is open upwardly.

14. The rear portion structure for a saddle type vehicle according to claim 13, wherein two front and rear hole portions are fastened to the stay supporting portion and are provided on the stay member;
- wherein said stay member includes first and second ribs, said first rib extending in a forward-rearward direction of the vehicle body frame below the seat and projecting upwardly with respect to a lower end of a side portion of the seat in the vehicle widthwise direction; and
- the second rib is formed at an inner side portion of said stay member relative to said second rib and extends so as to connect the two front and rear hole portions to each other.

15. The rear portion structure for a saddle type vehicle according to claim 14, wherein the stay member is disposed so as to be negatively inclined when extending toward a front of the vehicle body frame, and a drain hole disposed on an inner side of the stay member in the vehicle widthwise direction with respect to the first rib for discharging water therethrough is formed in a front portion of the stay member.

16. The rear portion structure for a saddle type vehicle according to claim 13, wherein the side bag supporting member includes upper and lower pipe-shaped stays extending in a forward and rearward direction of the vehicle;
- the side bag includes an upper stay supporting portion and a lower stay supporting portion locked from above to the upper and lower pipe-shaped stays, respectively; and
- the upper stay supporting portion and the lower stay supporting portion are locked by the upper and lower pipe-shaped stays, respectively, with elastic members interposed therebetween.

17. The rear portion structure for a saddle type vehicle according to claim 12, wherein two front and rear hole portions are fastened to the stay supporting portion and are provided on the stay member;
- wherein said stay member includes first and second ribs, said first rib extending in a forward-rearward direction of the vehicle body frame below the seat and projecting upwardly with respect to a lower end of a side portion of the seat in the vehicle widthwise direction; and
- the second rib is formed at an inner side portion of said stay member relative to said second rib and extends so as to connect the two front and rear hole portions to each other.

18. The rear portion structure for a saddle type vehicle according to claim 17, wherein the stay member is disposed so as to be negatively inclined when extending toward a front of the vehicle body frame, and a drain hole disposed on an inner side of the stay member in the vehicle widthwise direction with respect to the first rib for discharging water therethrough is formed in a front portion of the stay member.

19. The rear portion structure for a saddle type vehicle according to claim 12, wherein the side bag supporting member includes upper and lower pipe-shaped stays extending in a forward and rearward direction of the vehicle;
- the side bag includes an upper stay supporting portion and a lower stay supporting portion locked from above to the upper and lower pipe-shaped stays, respectively; and
- the upper stay supporting portion and the lower stay supporting portion are locked by the upper and lower pipe-shaped stays, respectively, with elastic members interposed therebetween.

20. The rear portion structure for a saddle type vehicle according to claim 12, wherein the side bag includes a container portion and a lid portion which covers the container portion; and said container portion including a plurality of vertical ribs and a horizontal rib, said vertical ribs extending in a direction in which the lid portion is opened and closed and serving to guide the lid portion, said horizontal rib serving to prevent water from entering in a direction perpendicular to the direction in which the vertical ribs extend.

\* \* \* \* \*